(12) United States Patent
Itoh et al.

(10) Patent No.: US 6,262,809 B1
(45) Date of Patent: *Jul. 17, 2001

(54) IMAGE PROCESSING APPARATUS SHIFTING IMAGE DATA BETWEEN ADJACENT PICTURE ELEMENTS

(75) Inventors: Tetsuya Itoh, Okazaki; Toshikazu Kawaguchi; Shigeru Sawada, both of Toyokawa, all of (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/519,017

(22) Filed: Aug. 14, 1995

Related U.S. Application Data

(63) Continuation of application No. 07/995,988, filed on Dec. 23, 1992, now abandoned.

(30) Foreign Application Priority Data

| Dec. 27, 1991 | (JP) | 3-359082 |
| Dec. 11, 1992 | (JP) | 4-353263 |
| Dec. 11, 1992 | (JP) | 4-353264 |
| Dec. 11, 1992 | (JP) | 4-353265 |

(51) Int. Cl.$^7$ .................................................. G06F 15/00
(52) U.S. Cl. ............................ 358/1.9; 358/1.2; 382/254
(58) Field of Search .................................. 382/254, 257, 382/260, 266, 269; 358/455, 456, 457, 458, 461, 454, 462, 447, 463, 298, 429, 459, 534, 536, 532; 395/109; 345/89; 347/15, 131, 183, 240, 251, 252, 253, 254; 399/180, 181; 359/893

(56) References Cited

U.S. PATENT DOCUMENTS

| 4,390,882 |   | 6/1983  | Ohara et al. ......................... 346/1.1 |
| 4,434,431 |   | 2/1984  | Ohkubo et al. ...................... 346/154 |
| 4,498,104 | * | 2/1985  | Schultz ................................... 382/54 |
| 4,847,654 |   | 7/1989  | Honma et al. ....................... 358/300 |
| 4,926,248 |   | 5/1990  | Kobayashi et al. .................... 358/75 |
| 4,926,267 | * | 5/1990  | Shu et al. ............................. 358/454 |
| 4,953,229 | * | 8/1990  | Abe et al. ............................. 382/284 |
| 4,975,786 | * | 12/1990 | Katayama et al. ................... 358/456 |
| 5,043,800 | * | 8/1991  | Snashall et al. ..................... 348/591 |
| 5,053,778 | * | 10/1991 | Imhoff .................................. 342/191 |
| 5,060,284 | * | 10/1991 | Klees ..................................... 382/50 |
| 5,144,338 | * | 9/1992  | Sakano ................................. 346/108 |
| 5,150,429 | * | 9/1992  | Miller et al. .......................... 382/50 |
| 5,210,602 | * | 5/1993  | Mintzer ................................. 382/50 |
| 5,274,715 | * | 12/1993 | Hsu ...................................... 382/109 |
| 5,293,254 | * | 3/1994  | Eschbach ............................. 358/445 |
| 5,307,426 | * | 4/1994  | Kanno et al. .......................... 382/54 |

FOREIGN PATENT DOCUMENTS 4-200075    7/1992   (JP) .

* cited by examiner

*Primary Examiner*—Dov Popovici
(74) *Attorney, Agent, or Firm*—Burns, Doane, Swecker & Mathis, LLP

(57) ABSTRACT

An image processing apparatus for forming an image on the basis of density data of respective picture elements corresponding to an original image, which includes a first memory for storing density data of the respective picture elements obtained by reading the original image, a multiline screen processing processor for processing the stored density data to add at least a part of density data of one of adjacent picture elements to that of another one, and a second memory for storing the processed density data. An image is formed by a printer on the basis of the density data stored in the second memory.

26 Claims, 46 Drawing Sheets

FIG. 27
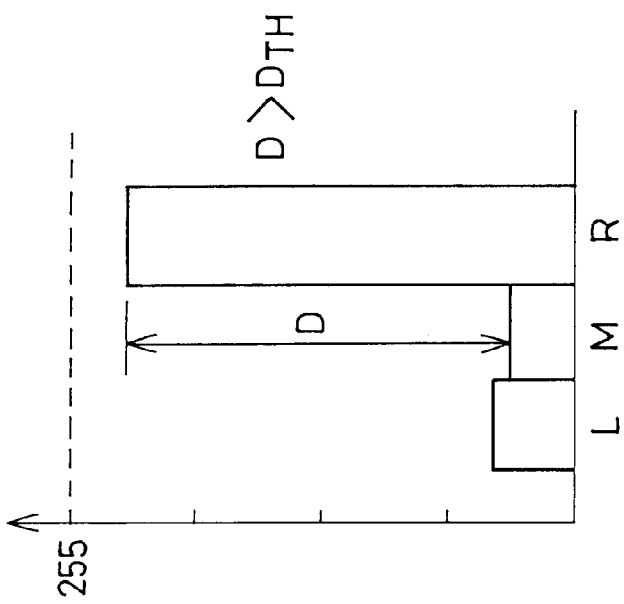
(2)
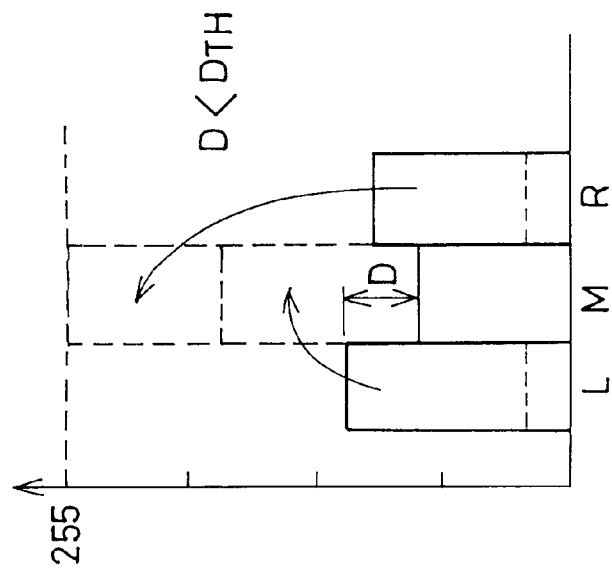
(1)

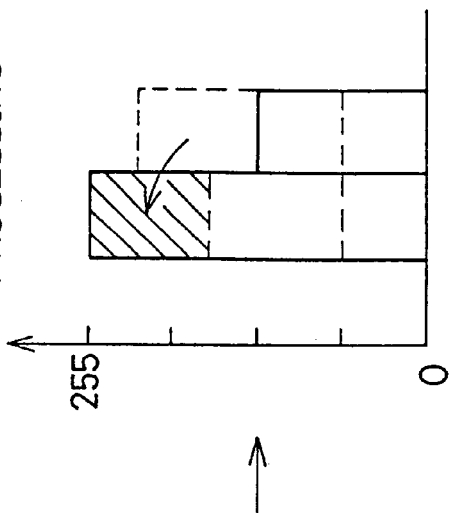
FIG. 42(1) INPUT DATA
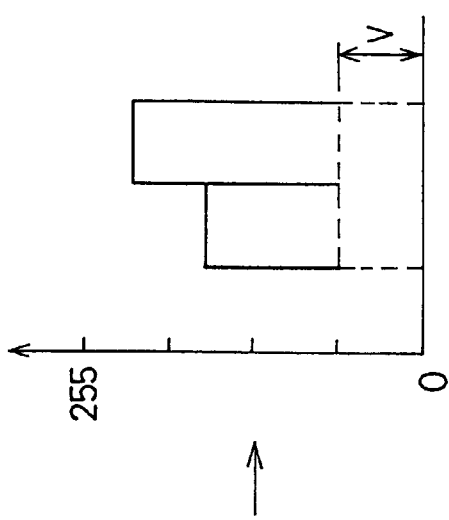
FIG. 42(2) HIGHLIGHT ENHANCEMENT OFFSET CORRECTION
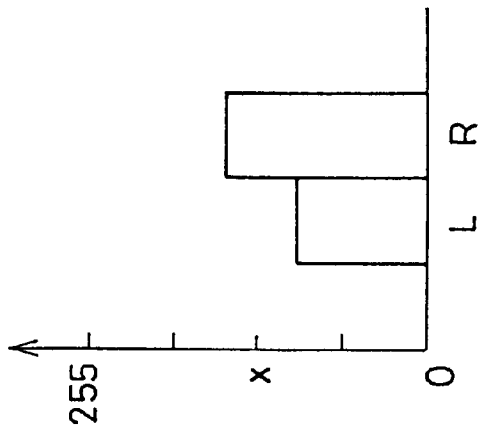
FIG. 42(3) MULTILINE SCREEN PROCESSING

IMAGE PROCESSING APPARATUS SHIFTING IMAGE DATA BETWEEN ADJACENT PICTURE ELEMENTS

This application is a continuation, of application Ser. No. 07/995,988, filed Dec. 23, 1992 now abandoned.

BACKGROUND OF THE INVENTION

1. Field of the Invention

The present invention relates to an image processing apparatus, and more particularly, it relates to an image processing apparatus for forming an image by reproducing density data in units of respective picture elements with a laser beam.

2. Description of the Related Art

In a recording apparatus of a scan recording type, various systems are employed for digitally reproducing variable densities of images. Such digital gradation reproducing methods include a dither method, an intensity modulation system and a pulse duration modulation system. The dither method is adapted to change on-off area rates of picture elements contained in a plurality of picture elements which are processed as a unit, thereby expressing the variable density of an image. The intensity modulation system is adapted to averagely apply laser energy to picture elements while modulating laser emission intensity in a multistep manner with respect to each picture element, thereby changing the variable density. The pulse duration modulation system is adapted to modulate an emission time per unit picture element while maintaining constant laser emission intensity, as disclosed in Japanese Patent Laying-Open Nos. 61-225971 (1986) and 62-116959 (1987), for example.

In the dither method of processing a plurality of picture elements as a unit, a moire noise which is specific to this method results in a deterioration of the image quality.

In the intensity modulation system, it is possible to basically output the variable density in one-to-one correspondence to the as-read image data, thereby attaining high resolution with fine and smooth gradation characteristics. In a highlight portion, however, it is difficult to attain excellent gradation reproducibility due to a requirement for delicate variable-density control. Further, rough graininess of a half tone portion is stressed due to an influence by the backing of an image recording paper.

On the other hand, the pulse duration modulation system does not have the problem of graininess that arises in the intensity modulation system. However, this system generally moves centers of gravity of picture elements with respect to units of two picture elements. When density data of 400 DPI are reproduced, for example, only reproducibility of 200 DPI is substantially attained to reduce resolution. When the pulse duration modulation system is employed in a unit of a single picture element, on the other hand, the laser emission time is considerably reduced in a picture element having low density, leading to insufficient stability of the image quality in view of toner adhesion.

SUMMARY OF THE INVENTION

An object of the present invention is to improve graininess of a half tone portion in an image processing apparatus while maintaining resolution.

Another object of the present invention is to improve gradation reproducibility of a highlight portion in an image processing apparatus while maintaining resolution.

Still another object of the present invention is to attain continuity of processing in an image processing apparatus at a boundary portion between different types of images which are contained in an original.

A further object of the present invention is to enable tone control while improving graininess of a half tone portion with no influence on a character image.

In order to attain the aforementioned objects, an image processing apparatus according to a first aspect of the present invention is directed to an apparatus for processing image data obtained by reading an original image every picture element, which comprises processing means for successively dividing picture elements arranged along a main scanning direction into an adjacent pair and reducing image data of one picture element by a first prescribed quantity while increasing that of the other picture element by the first prescribed quantity.

The image processing apparatus having the aforementioned structure shifts density data between an adjacent pair of picture elements while maintaining the density of the overall pair, whereby it is possible to improve graininess of a half tone portion while maintaining resolution.

In order to attain the aforementioned objects, an image processing apparatus according to a second aspect of the present invention is directed to an apparatus for processing image data obtained by reading an original image every picture element, which comprises detection means for detecting a difference between the quantities of image data of adjacent picture elements, decision means for deciding a data shift quantity in response to the difference detected by the detection means, means for reducing image data of one of the adjacent picture elements by the data shift quantity decided by the decision means, and means for increasing image data of the other one of the adjacent picture elements by the data shift quantity decided by the decision means.

The image processing apparatus having the aforementioned structure decides the data shift quantity in response to a density difference between adjacent picture elements, whereby continuity is attained in processing at a boundary portion between different types of images.

In order to attain the aforementioned objects, an image processing apparatus according to a third aspect of the present invention is directed to an apparatus for processing image data obtained by reading an original image every picture element, which comprises addition means for adding a first prescribed quantity to image data of each of adjacent picture elements, means for subtracting a second prescribed quantity from image data of one of the picture elements, and means for increasing image data of the other picture element by the second prescribed quantity.

The image processing apparatus having the aforementioned structure increases the image data of each of adjacent picture elements by a first prescribed quantity to thereafter shift the density data, whereby it is possible to control the tone while improving graininess of a half tone portion.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 27 schematically illustrates processing for shifting density data with respect to three adjacent data according to the second embodiment of the present invention;

FIG. 42 illustrates the principle of image processing with reference to highlight enhancement according to the fifth embodiment of the present invention;

DESCRIPTION OF THE PREFERRED EMBODIMENTS

Figure 1:
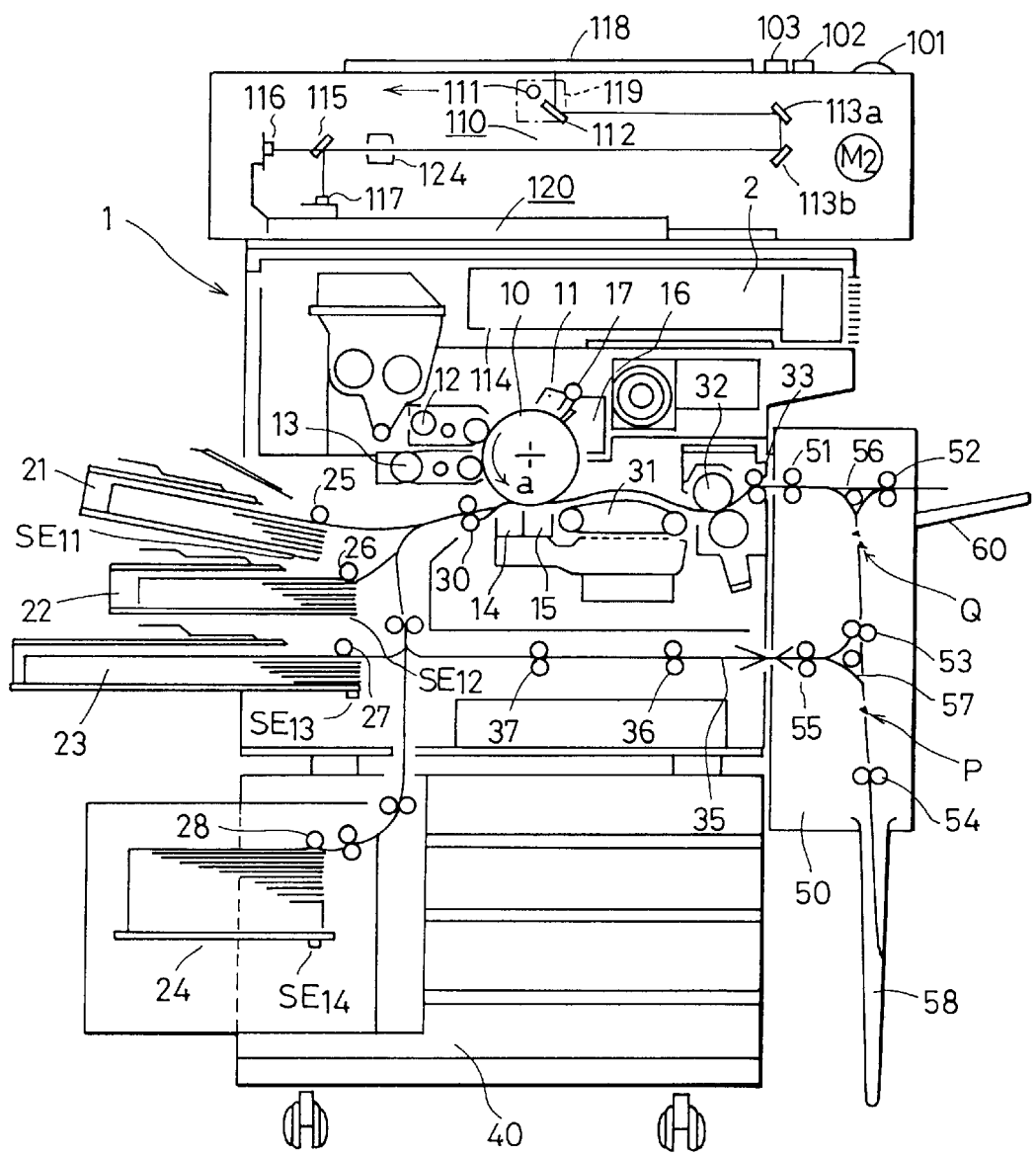
FIG. 1 is a sectional view showing the body of a digital copying machine according to a first embodiment of the present invention.

FIG. 1 is a sectional view showing the body of a digital copying machine according to a first embodiment of the present invention.

Referring to FIG. 1, a printer body 1 is set on a desk 40, and a photoreceptor drum 10 is arranged substantially on its central portion to be rotatable along arrow a. A corona charger 11, magnetic brush type developing devices 12 and 13, a transfer charger 14, a copy paper separation charger 15, a residual toner cleaner 16, a residual charge eraser lamp 17 and the like are set around the photoreceptor drum 10. An image is charged on the photoreceptor drum 10 by a laser beam scanning optical system 2, and then immediately exposed. The image is printed by these elements in well-known processing, and hence redundant description is omitted.

On the other hand, the printer body 1 is provided on its left side with three stages of automatic paper feed cassettes 21, 22 and 23, while the desk 40 is provided with an optional elevator-type automatic paper feed unit 24. Sensors SE11 to SE14 are adapted to detect sizes and weights of copy papers which are stored in the cassettes 21, 22 and 23 and the unit 24 respectively. The copy papers are selectively fed one by one from the cassettes 21, 22 and 23 and the unit 24 by paper feed rollers 25 to 28 respectively through passages shown with thick lines in FIG. 1. Each copy paper is temporarily held by timing rollers 30, to be fed into a transfer portion in synchronization with an image which is formed on the photoreceptor drum 10. After a toner image is transferred, the copy paper is transported to a fixing device 32 by a transport belt 31 so that the toner is heated and fixed therein, and thereafter the copy paper is discharged from the body 1 through discharge rollers 32, to be introduced into a paper inversion unit 50.

The paper inversion unit 50 has a function of feeding the copy paper into a paper refeed path 35 which is formed by rollers 36 and 37 etc. and a function of selectively processing face-up paper discharge (non-inversion mode) for directly transporting the copy paper to a paper discharge tray 60 and face-down paper discharge (inversion mode) for inverting the copy paper, for duplex printing of printing an image on a non-printed side of a paper having a printed side or composite printing of superposingly printing images on the same side.

In order to achieve the aforementioned functions, the paper inversion unit 50 has receiving rollers 51, delivery rollers 52, normal-reverse rotation switching rollers 53 and 54 and a switch-back path 58. Switching claws 56 and 57 can be switched between two positions of rotation angles by solenoids (not shown).

In the non-inversion mode, each copy paper received through the receiving rollers 51 is guided by an upper surface of the switching claw 56, to be delivered to a paper tray 60 from the delivery rollers 52 in a face-up state. In the inversion mode, on the other hand, each copy paper received through the receiving rollers 51 is guided by a left side surface of the switching claw 56, so that the forward end portion of the copy paper reaches the switch-back path 58 by normal rotation of the rollers 54. Then the copy paper is inverted and guided by a right side surface of the switching claw 56, to be delivered to the paper tray 60 through the delivery rollers 52 in a face-down state.

In the duplex printing mode, further, each copy paper is transported to the switch-back path 58 similarly to the inversion mode, and the rollers 54 are switched to reverse rotation when the rear end of the copy paper reaches an inversion point P. Then the copy paper is inverted and guided by a left lower surface of the switching claw 57, to be delivered into the paper refeed path 35 through the paper refeed rollers 36 and 37. In the composite printing mode, on the other hand, each copy paper passing through the rollers 53 is guided by a left upper surface of the switching claw 56, to be delivered into the paper refeed path 35 through the paper refeed rollers 36 and 37.

An image reader (IR) optical system 110 is adapted to expose/scan an original which is placed on a platen glass 118, to convert reflected light components received therefrom into electric signals by photoelectric conversion elements 116 and 117 formed by CCD arrays, for example. The photoelectric conversion elements 116 and 117 convert an image of a specific color such as black and another image of another color such as red into electric signals respectively, for example.

The image reader (IR) optical system 110 has an exposure lamp 111 for irradiating the original and a reflecting mirror 112 for changing the directions of the reflected light components received from the original, which are mounted on a scanner 119 translating with the platen glass 118 by a scan motor M2, two mirrors 113a and 113b for changing the optical paths of the light components received from the reflecting mirror 112, a lens 124 for condensing the reflected light components, a half mirror 115 for judging colors through wavelengths of the reflected light components and reflecting or transmitting the same for guiding the reflected light components to the two photoelectric conversion elements 116 and 117, and the photoelectric conversion elements 116 and 117 for generating electric signals in response to the received light components. The scanner 119 is leftwardly moved as shown by arrow, to expose/scan the original.

Figure 2:
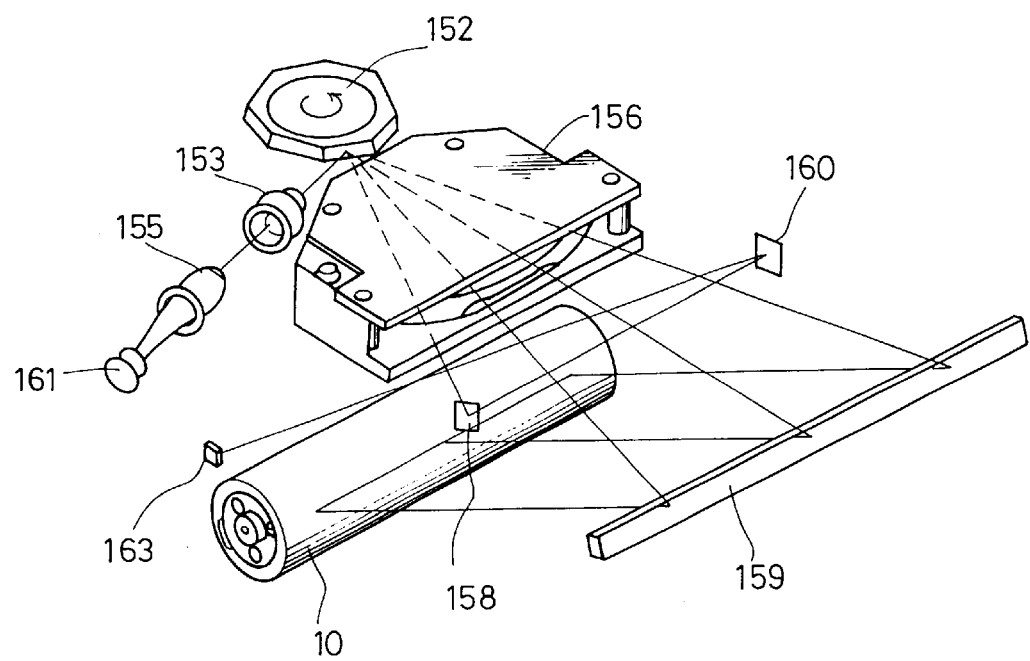
FIG. 2 is a perspective view showing the structure of an optical system in an optical unit 2 shown in FIG. 1.

FIG. 2 is a perspective view showing the structure of a laser optical system in the optical unit 2 shown in FIG. 1.

Referring to FIG. 2, a laser beam outgoing from a semiconductor laser element 161 in response to a drive signal passes through a collimator lens 155 and a cylindrical lens 153, to enter one surface of a polygon mirror 152. The beam reflected by this surface passes through an f-θ lens 156 to be reflected by a mirror 159, and goes out from the optical unit 2 through a slit 114 to enter the photoreceptor drum 10, thereby exposing the same. With rotation of the polygon mirror 152, the direction of the beam reflected by each surface thereof is changed as shown in FIG. 2, to scan the photoreceptor drum 10 along the axial direction. In order to attain synchronization with this axial scanning, the laser beam is reflected by the mirrors 158 and 160 in starting of the scanning, to enter a photodiode (SOS sensor) 163. In arrangement of the optical system, the mirrors 158 and 160 and the photodiode 163 are so arranged that the optical path length between the polygon mirror 152 and the photodiode 163 is substantially equal to that between the polygon mirror 158 and the photoreceptor drum 10.

Figure 3:
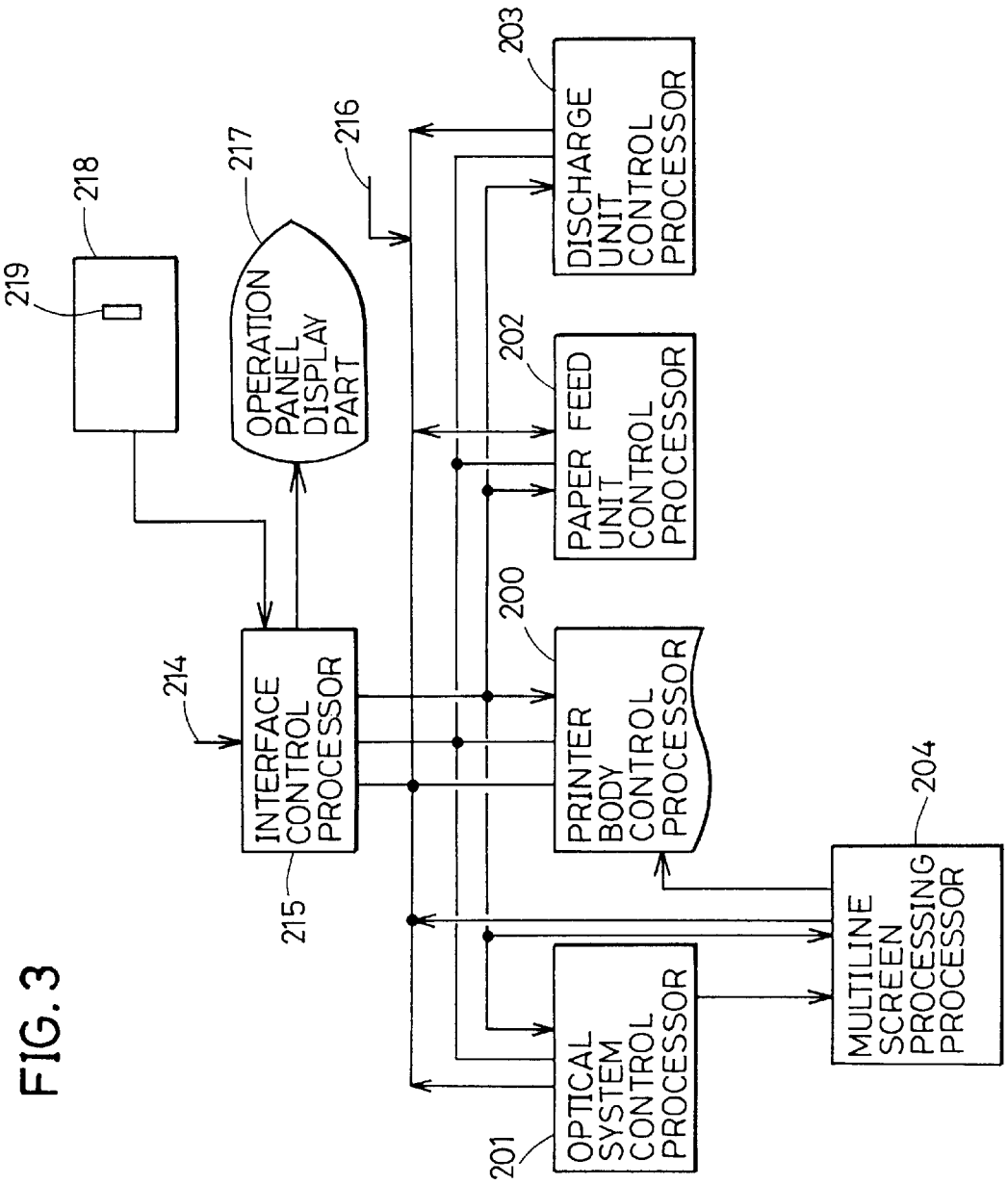
FIG. 3 is a block diagram showing the overall structure of the system of the digital copying machine shown in FIG. 1.

FIG. 3 is a block diagram showing the overall structure of the system of the digital copying machine shown in FIG. 1.

Referring to FIG. 3, the printer includes a control processor 200 for controlling the printer body, a control processor 201 for controlling the image reader (IR) optical system 110, a control processor 202 for controlling a paper feed option (if any), and a control processor 203 for controlling a paper discharge option (if any). Printing information is transmitted from the optical system control processor 201 to the printer body control processor 200 through a multiline screen processing processor 204 for processing density data.

A signal for a printing mode or the like is transmitted to an interface control processor 215 through a control line 214. This interface control processor 215 communicates with the processors 200 to 203 in various modes through a serial interface 216. Further, the interface control processor 215 receives input from an operating part 218, and on-off controls an operation panel display part 217 provided on the printer body. The display part 217 displays various data in the exterior on the basis of instructions from the processor 215.

The operating part 218 is provided with a transfer switch 219 for switching processing modes. In other words, this switch 219 is adapted to switch a mode for performing multiline screen processing as described later and a mode for performing ordinary processing. The processing modes are thus switched since the ordinary processing mode may be more suitable for processing an original which is mostly formed by a character while the multiline screen processing mode may be more preferable for an original containing a character and a photograph in consideration of image quality. Thus, optimum processing is enabled in response to the type of the original.

Figure 4:
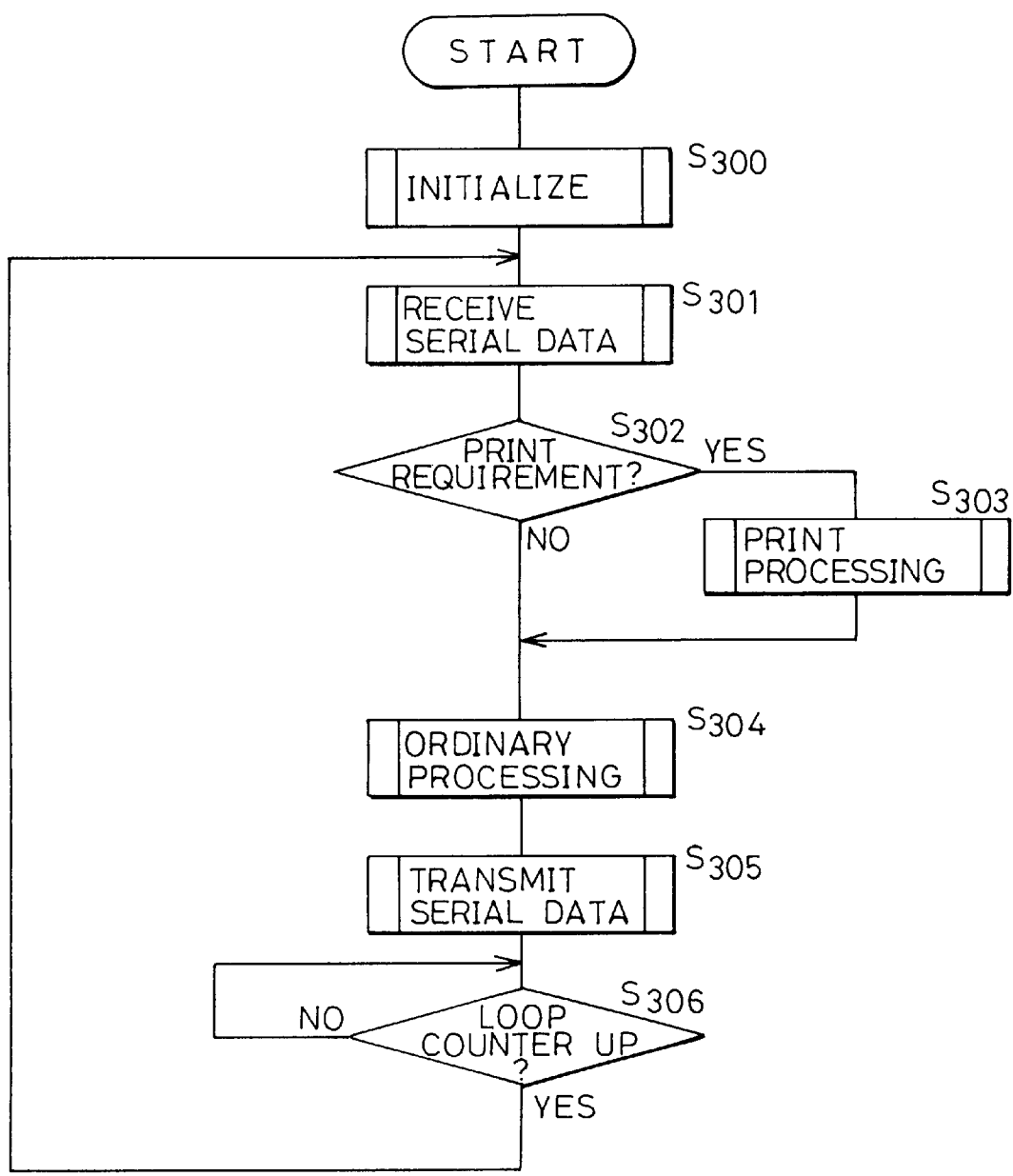
FIG. 4 is a flow chart showing a main routine of the digital copying machine shown in FIG. 1.

FIG. 4 is a flow chart showing a main routine of the interface control processor 215 shown in FIG. 3.

First, initialization is made at a step S300, to clear an internal RAM and the like. Then, serial data are received (S301), to set conditions such as the printing mode, printing requirement and the like. Then, a determination is made at a step S302 as to whether or not printing requirement is set. If the determination is of yes, printing processing (S303) is performed. In more concrete terms, P/C is started, papers are fed and rollers are controlled.

Then, ordinary processing is performed at a step S304, regardless of a printing state or a waiting state. Thereafter data such as printing sequence and the state of the printer body control processor 200 are transmitted to the interface control processor 215 by serial transmission (S305).

Finally, counter-up of one loop is checked (S306), and the flow is returned to the step S301.

Figure 5:
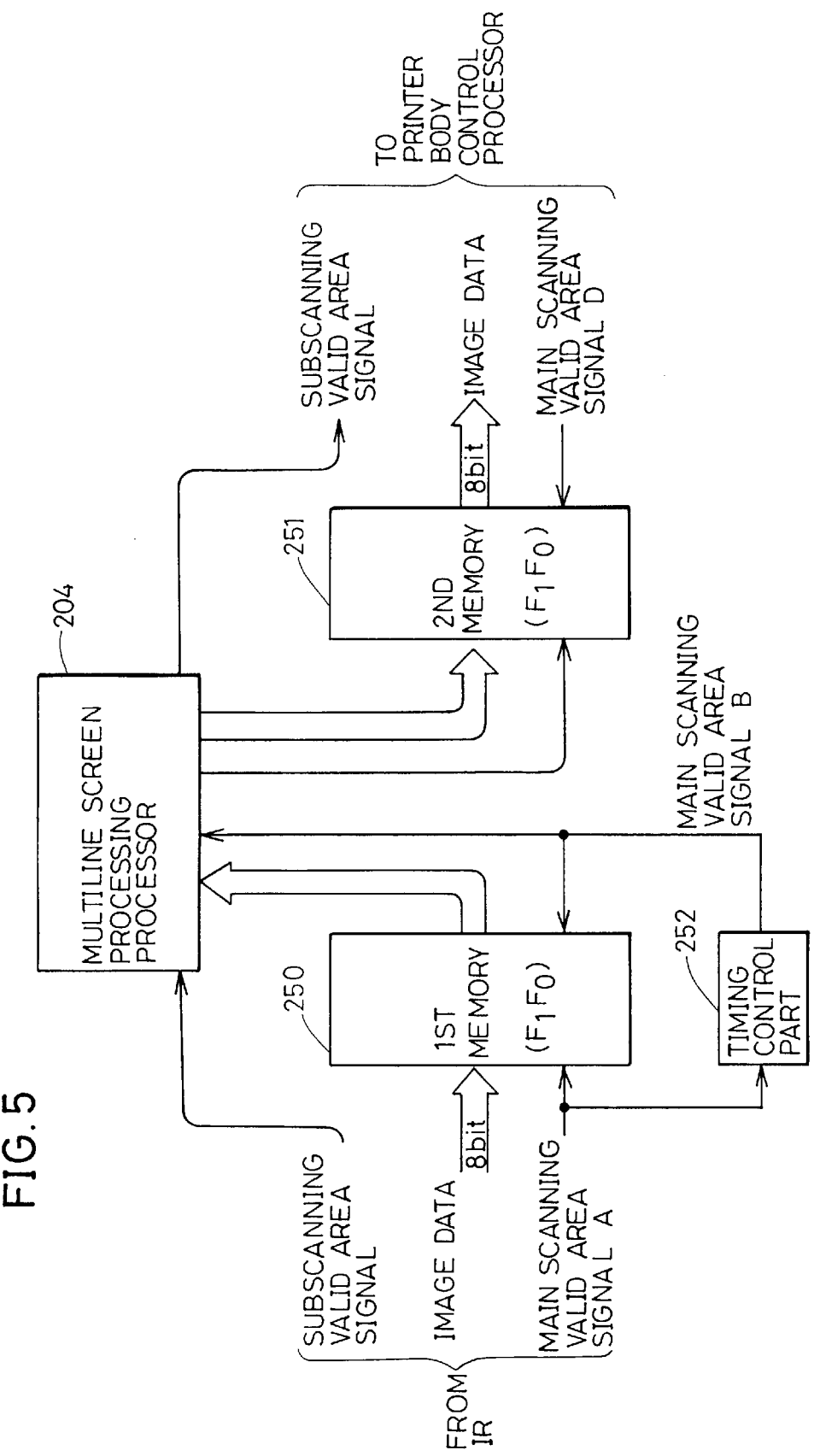
FIG. 5 is a system block diagram showing the structure around a multiline screen processing processor shown in FIG. 3.

FIG. 5 is a system block diagram showing a structure around the multiline screen processing processor 204 shown in FIG. 3.

Figure 7:
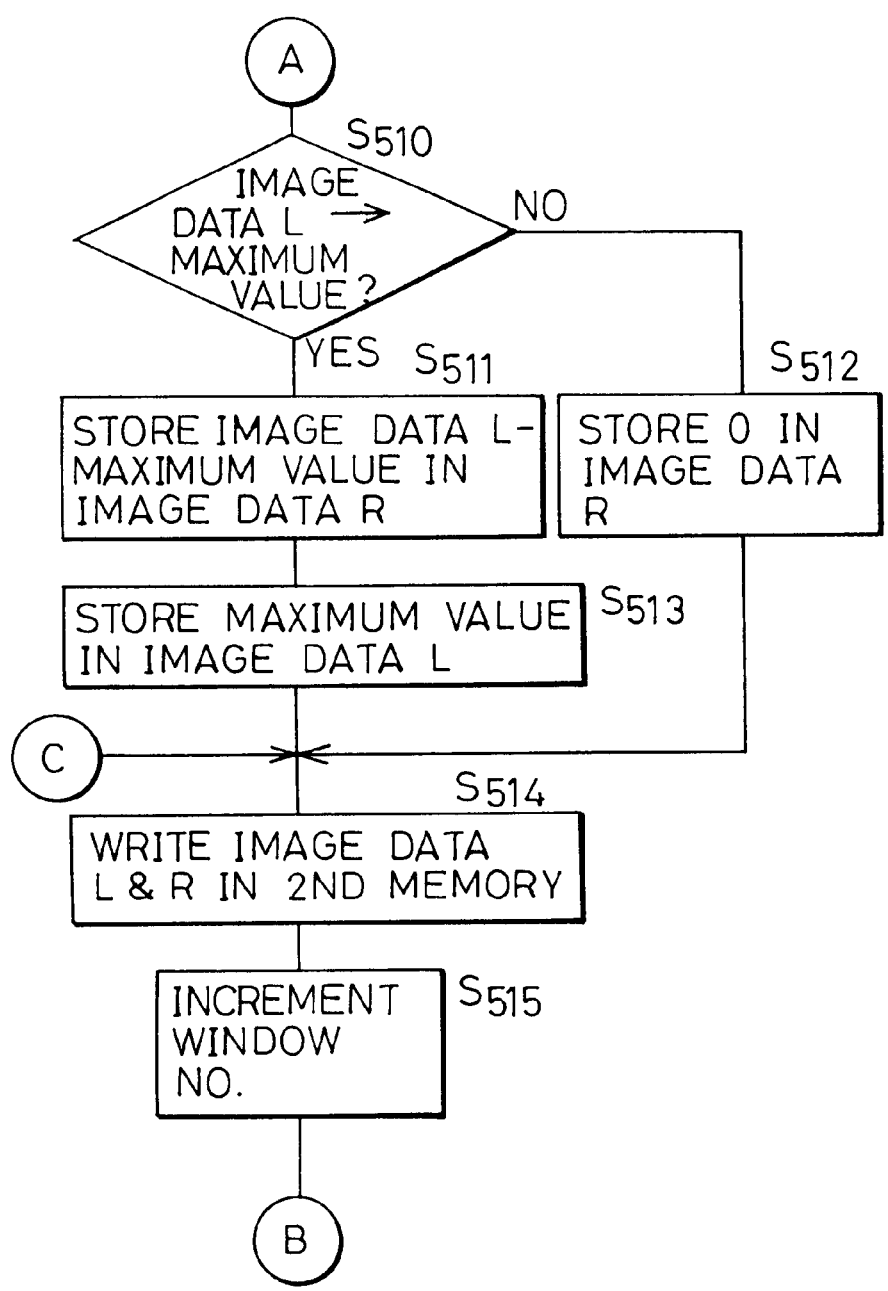
FIG. 7 is another part of the flow chart showing the content of control by the multiline screen processing processor shown in FIG. 5.
Figure 8:
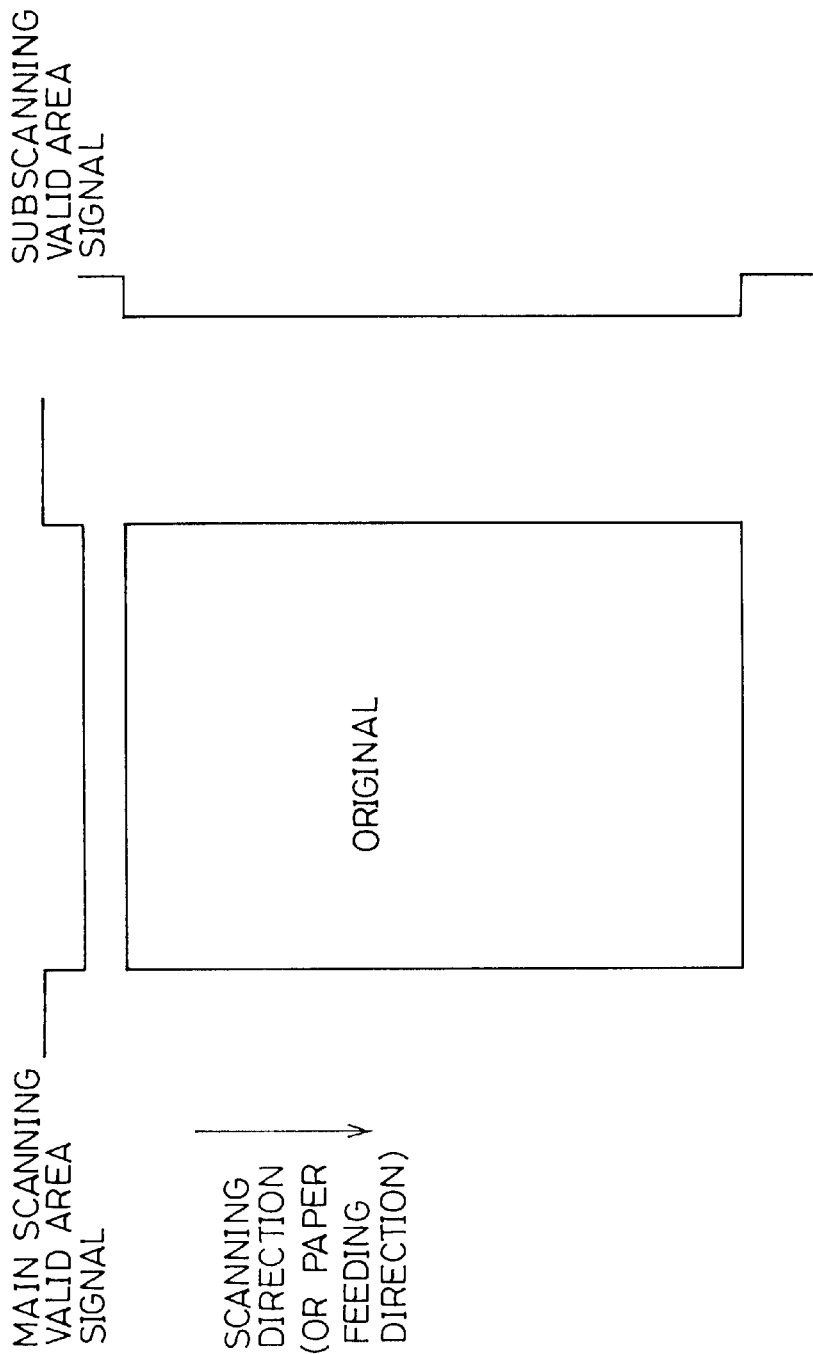
FIG. 8 illustrates changes of a main scanning valid area signal and a subscanning valid area signal according to the first embodiment of the present invention with respect to an original.
Figure 9:
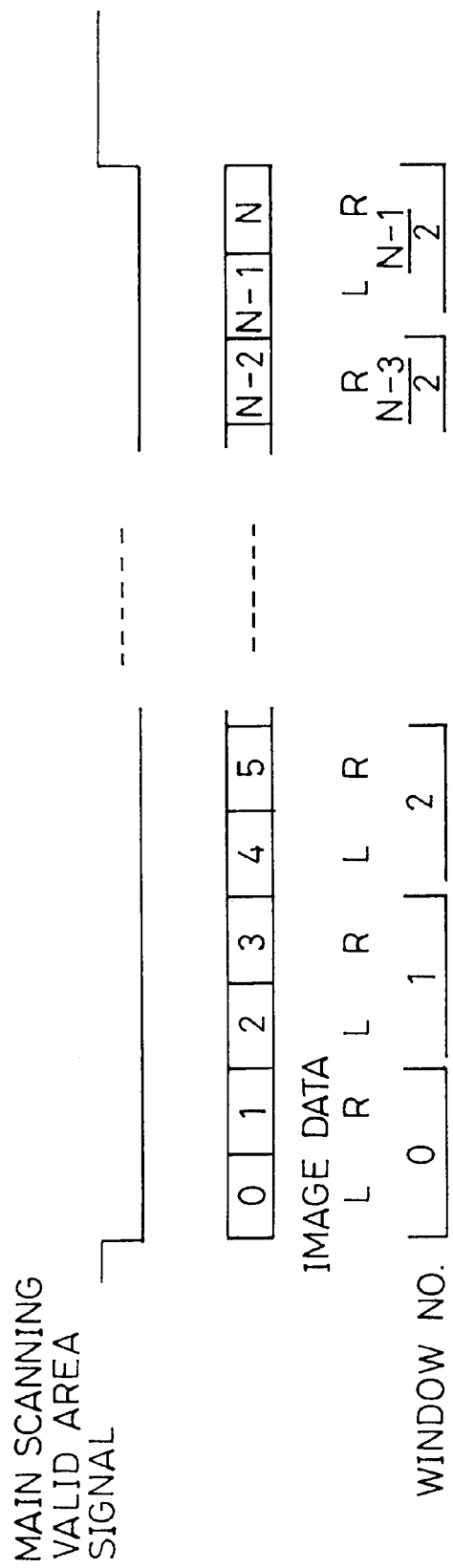
FIG. 9 illustrates relations between a main scanning valid area signal, image data and window numbers according to the first embodiment of the present invention.

Referring to FIG. 5, 8-bit image data read by the image reader IR are written in a first memory (FIFO) 250 every line. A main scanning valid signal A indicating presence of an original in the main scanning direction shown in FIG. 8 is also transmitted from the image reader IR with the image data, so that the signal is inputted in a timing control part 252 and the first memory 250. Further, a subscanning valid area signal indicating presence of the original in the scanning direction shown in FIG. 8 is also supplied to the multiline screen processing processor 204. After a lapse of a prescribed time, the timing control part 252 generates a main scanning valid area signal B, to supply the same to the processor 204 and the first memory 250. Processing shown in a flow chart of FIG. 7 is executed by this signal as described later, so that image data for one line are processed every window corresponding to two picture elements as shown in FIG. 9. The image data processed by the multiline screen processing processor 204 every two picture elements are written in a second memory 251. The processed image data stored in the second memory 251 are outputted as 8-bit image data to the printer body control processor 200 by printing timing, so that a laser printer forms an image on the basis of the data.

Figure 6:
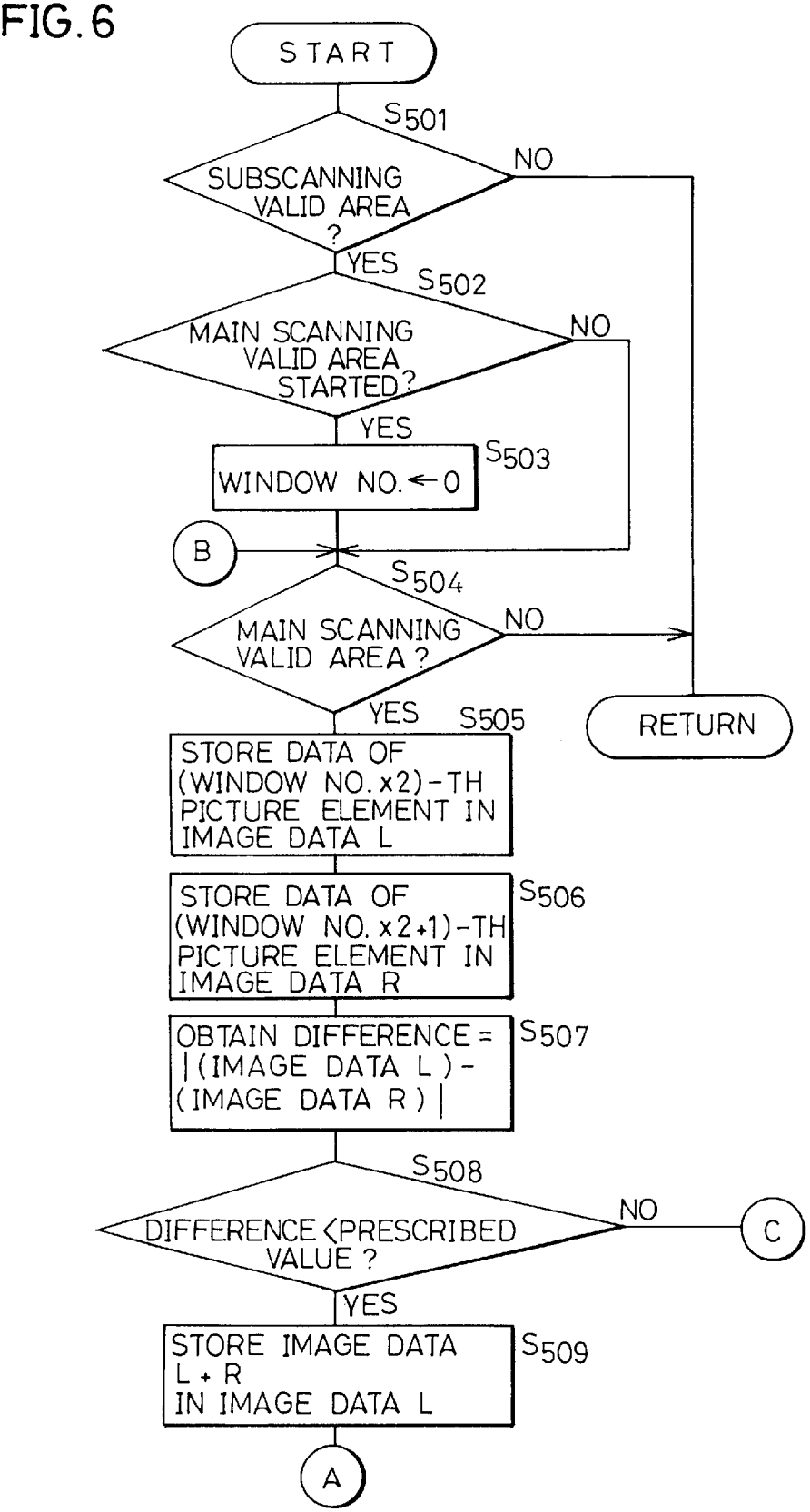
FIG. 6 is a part of a flow chart showing the content of control by the multiline screen processing processor shown in FIG. 5.

FIGS. 6 and 7 are flow charts showing the content of printing processing control performed by the multiline screen processing processor 204 shown in FIG. 3.

Before explaining the flow charts in concrete terms, the content of this control is schematically described with reference to FIGS. 8 to 11.

FIG. 8 illustrates on-off relations of the main scanning and subscanning valid area signals with respect to the original to be read. As shown in FIG. 8, the main scanning valid area signal is changed when the original is present along a line direction, i.e., the main scanning direction, while the subscanning valid area signal is changed when the original is present along the scanning direction or the paper feeding direction.

FIG. 9 illustrates relations between the main scanning valid area signal, respective image data and window numbers. This figure shows N+1 picture elements having image data of 0 to N for one line, for example. A single window number is applied to every adjacent pair of picture elements. Namely, a window number W0 corresponds to image data 0 and 1, while a window number W(N−1)/2 corresponds to image data N−1 and N. For the convenience of illustration, it is assumed that the image data 0 corresponds to left density data L of the window W0 and the image data 1 corresponds to right density data R of the window W0. Similarly, the image data N−1 corresponds to left density data L of the window W(N−1)/2, and the image data N corresponds to right density data R of the window W(N−1)/2.

Figure 10:
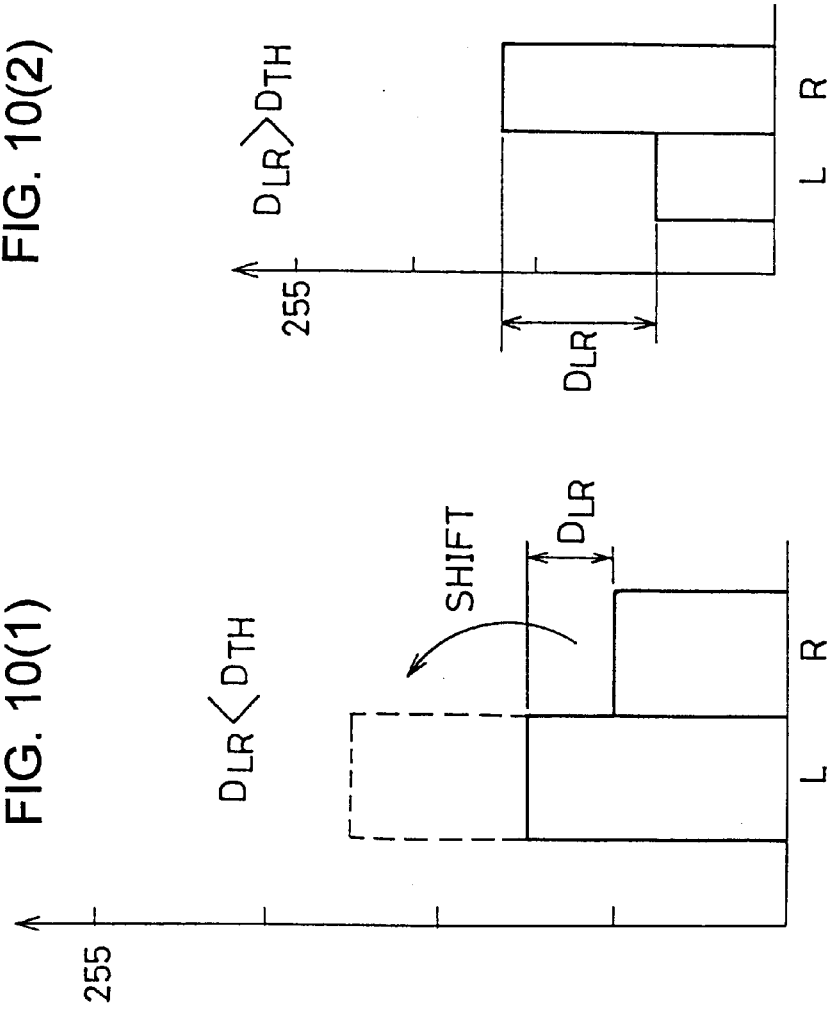
FIG. 10 schematically illustrates data processing in shifting of density data in adjacent picture elements according to the first embodiment of the present invention.

FIG. 10 schematically shows processing of density data for respective picture elements.

The basic idea of density data processing according to the present invention is shown at (1) in FIG. 10. Referring to this figure, the axis of ordinates shows density levels of 256 gradations (0 to 255), and the axis of abscissas shows left and right density data L and R of a certain window. In this example, the density value of the left density data L is larger than that of the right density data R by a difference DLR. When this difference DLR is smaller than a certain threshold value DTH, the value of the right density data R is shifted to the left density data L as shown by broken lines. In this example, the value of the left density data L is increased to the position shown by broken lines as the result, while the value of the right density data R is zeroed.

In a case shown at (2) in FIG. 10, on the other hand, a difference DLR between left and right density data is larger than the threshold value DTH. In this case, no density data is shifted dissimilarly to the case shown at (1). If the density data is shifted in an image containing e.g. character data whose edge portions are clearly shown, positions of the edge portions are inevitably moved to result in unpreferable image reproducibility.

Still another example of image data shifting is shown at (3) in FIG. 10. In this case, a difference DLR between left and right density data L and R is smaller than the threshold value DTH and hence the density data is basically shifted as shown at (1). If the value of the right density data R is entirely shifted in this case, however, the value of the left density data L exceeds the maximum value 255 of the density level since this data originally has a large value. In this case, therefore, the quantity of shifting from the right density data R is decided as shown by broken lines so that the upper limit of the left density data L is 255 at the maximum. As the result of shifting, therefore, the value of the left density data L reaches 255 at the maximum while the value of the right density data R is not zeroed but this data remains as that in the position shown by broken lines. Thus, the quantity of toner adhesion is maximized in a picture element corresponding to the left density data L, and the density levels of the overall picture elements forming this window are maintained.

Figure 11:
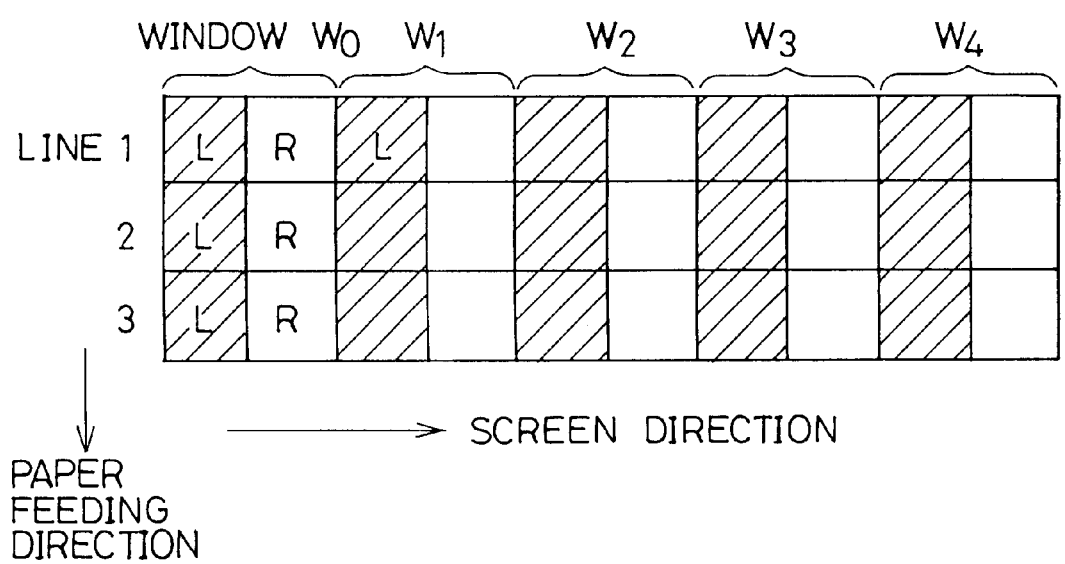
FIG. 11 illustrates density data shifted between respective picture elements in relations between window numbers and line numbers.

FIG. 11 shows states of picture elements corresponding to the windows W0 to W4 and first to third lines as the result of data shifting at (1) in FIG. 10. As shown in FIG. 11, the right density data R are entirely shifted to the left density data L, whereby densities of the picture elements forming the windows W0 to W4 are shifted to the left picture elements L to perform multiline screen processing for enhancing every other picture elements. While the values of the right picture elements R are zeroed after the shifting in this example, the densities of the left picture elements L are enhanced also when the data are shifted as shown at (3) in FIG. 10, thereby attaining an effect similar to that of the multiline screen processing.

The flow charts shown in FIGS. 6 and 7 are now described. When processing by the multiline screen processing processor 204 is started, a determination is made at a step S501 as to whether or not the subscanning valid area signal is changed. If no change is caused in the subscanning valid area signal, i.e., the optical system reads no original, the flow is directly returned. If the determination is of yes, on the other hand, a determination is made at a step S502 as to whether or not the main scanning valid area signal is changed. A change of this signal means that the optical system starts to scan the original in the main scanning direction, and hence a window number is reset at zero at a step S503. If the main scanning valid area signal is already changed, on the other hand, the flow skips the step S503 to be advanced to a step S504. At the step S504, a determination is made as to whether or not an object to be read from the original is in a main scanning valid area. If the determination is of no, no multiline screen processing is performed and the flow is directly returned.

If the object to be scanned by the optical system is in the main scanning valid area, on the other hand, an even picture element is loaded in the multiline screen processing processor 204 from the picture elements stored in the first memory 250 at a step S505. Namely, data of a (window number×2)-th picture element is stored in the left image data L. Then, an odd picture element is loaded from the image data stored in the first memory 250 at a step S506. Namely, data of a (window number×2+1)-th picture element is stored in the right image data R.

Then, the absolute value of the difference between the image data L and R stored at the steps S505 and S506 is calculated at a step S507. Namely, dispersion of density data between adjacent picture elements is obtained at the step S507.

Then, a determination is made at a step S508 as to whether or not the as-obtained difference is less than a prescribed value. If the difference is not less than the prescribed value, this corresponds to the state shown at (2) in FIG. 10, and the flow is returned to the step S514. In this case, no image data is shifted and hence the values of the image data L and R read out from the first memory 250 are directly outputted to the second memory 251 and stored therein. Then, the window number is incremented to process image data for a next window at a S515, and the flow is returned to the step S504.

If the difference is less than the prescribed value at the step S508, the flow is advanced to a step S509 to process the image data as shown at (1) or (3) in FIG. 10. At the step S509, a value obtained by adding up the image data L and R is stored in the image data L. At a step S510, a determination is made as to whether or not the value of the image data L exceeds the maximum value, i.e., 255 in the case of FIG. 10. If the determination is of no, a value of zero is stored in the image data R at a step S512 to process the image data as shown at (1) in FIG. 10. The image data L and R decided at the steps S509 and S512 are outputted at a step S514 to the second memory 251 and stored therein, and the window number is incremented at a step S515 so that the flow is thereafter returned to the step S504.

If the image data L obtained at the step S509 is in excess of the maximum value at the step S510, on the other hand, processing corresponding to that shown at (3) in FIG. 10 is performed. Namely, a value obtained by subtracting the maximum value from the image data L is stored in the image data R at the step S511. In other words, the position of the right image data R shown by broken lines is obtained as shown at (3) in FIG. 10. Then, the maximum value 255 is stored in the image data L at a step S513. Thereafter processing is performed along the steps S514 and S515, and the window number is incremented to process picture elements corresponding to the next window number, so that the flow is returned to the step S504.

Figure 12:
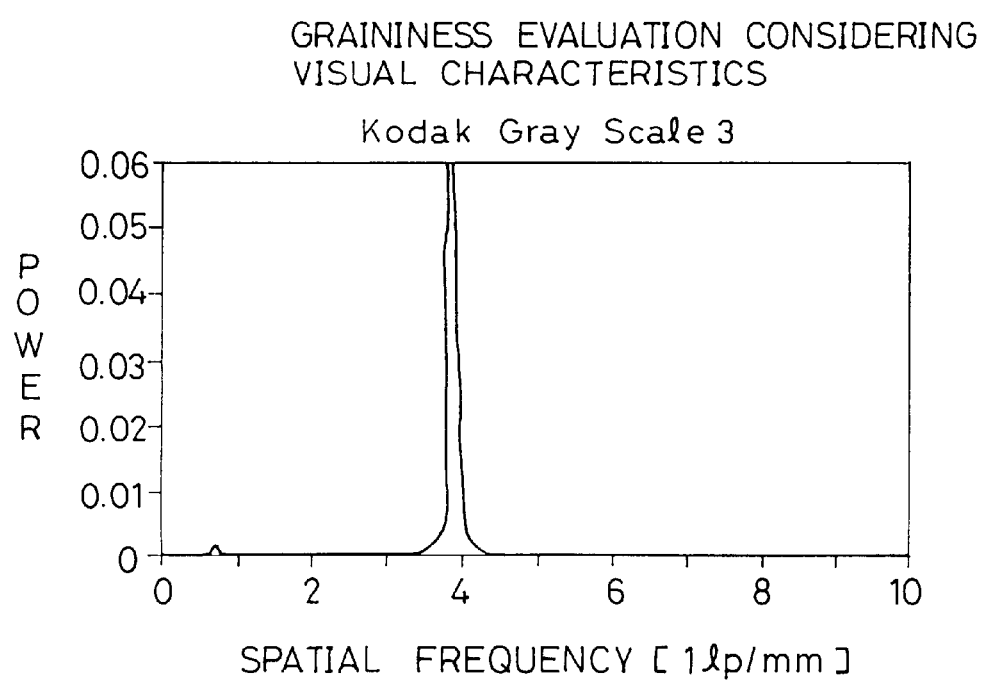
FIG. 12 illustrates graininess evaluation in consideration of visual characteristics with respect to an image to which the first embodiment of the present invention is applied.
Figure 13:
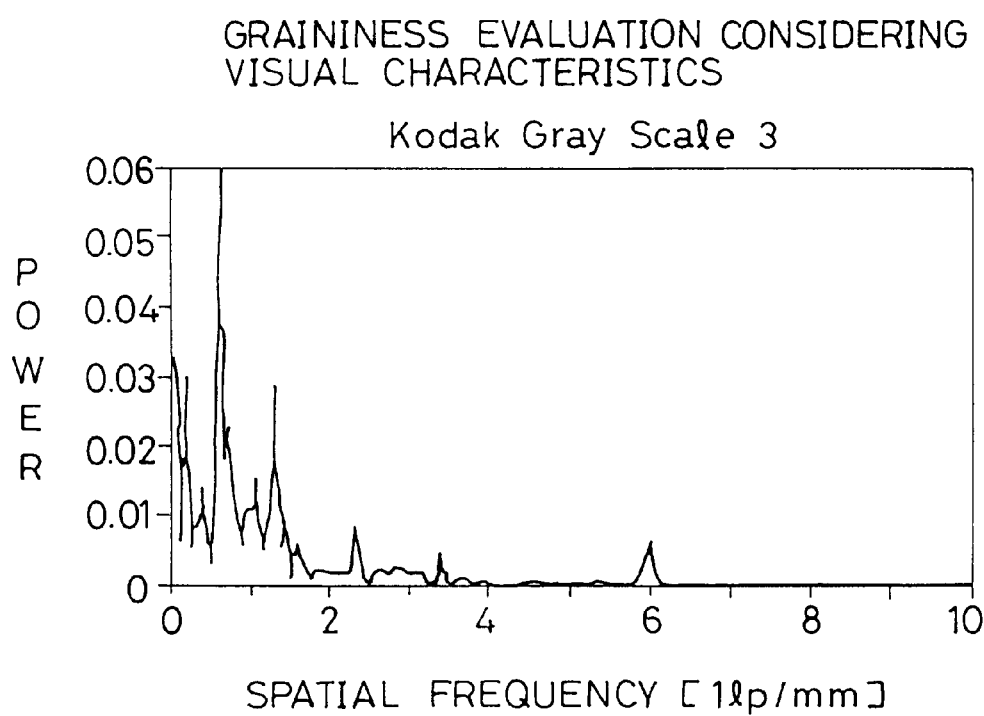
FIG. 13 illustrates graininess evaluation in consideration of visual characteristics with respect to an image by a conventional intensity modulation system in relation to FIG. 12.

FIG. 12 illustrates graininess evaluation of an image which is formed by the embodiment of the present invention in consideration of visual characteristics. On the other hand, FIG. 13 illustrates graininess evaluation of an image which is formed by the conventional intensity modulation system in correspondence to FIG. 12. Referring to each of these figures, the axis of abscissas shows spatial frequencies, and the axis of ordinates shows respective power levels corresponding to the spatial frequencies. It is clearly understood that the power levels are concentrated around a spatial frequency 4 (1 p/mm) in FIG. 12, while noises are caused in frequency components lower than a spatial frequency 4 (1 p/mm) in FIG. 13.

Figure 14:
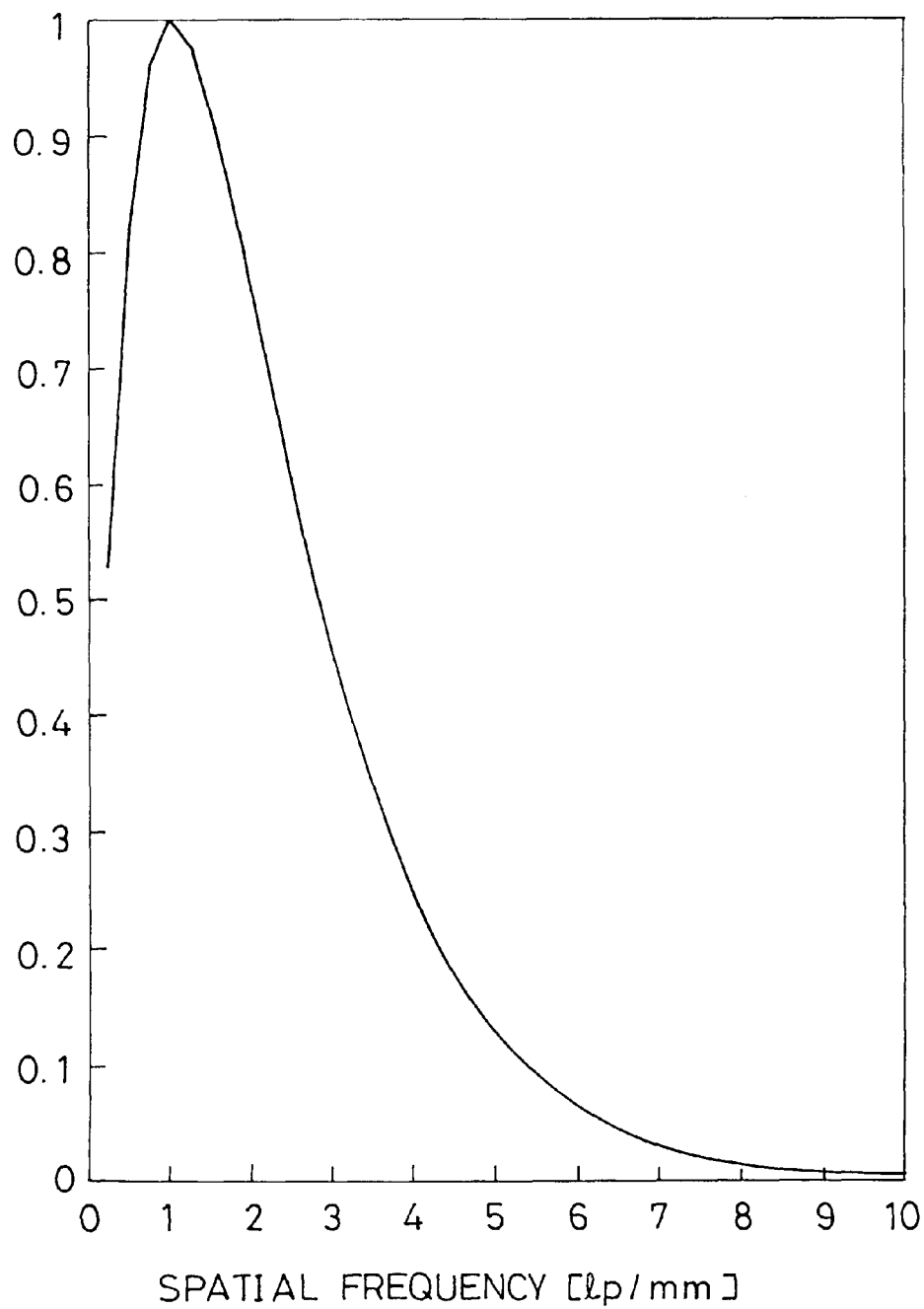
FIG. 14 illustrates visual MTF characteristics for evaluating FIGS. 12 and 13.

FIG. 14 is a visual MTF characteristic diagram by Dooley, showing influences exerted on vision by spatial frequencies as noises.

Referring to FIG. 14, the axis of abscissas shows spatial frequencies, while the axis of ordinates shows levels of influences exerted on vision as noises. As the values of such levels approach 1, the picture quality is reduced for the eyes of a human as noises. As clearly understood from FIG. 14, the maximum noise effect is shown at the value of the spatial frequency 1 (1 p/mm). When graininess evaluation is made on FIGS. 12 and 13 on the basis of FIG. 14, the effect of the multiline screen processing according to the embodiment of the present invention is remarkably recognized. Namely, it is understood that the embodiment of the present invention shown in FIG. 12 has extremely small components around the spatial frequency 1 (1 p/mm), while the components are concentrated around the spatial frequency 1 (1 p/mm) in the conventional intensity modulation system shown in FIG. 13.

Figure 15:
FIG. 15 shows an original image read by the digital copying machine according to the first embodiment of the present invention.
Figure 16:
FIG. 16 shows an image formed by the first embodiment of the present invention with respect to the original image shown in FIG. 15.

FIG. 15 shows a photographic image which is read for showing the effect of the embodiment according to the present invention, and FIG. 16 shows an image obtained by reading the original image of FIG. 15 and performing the multiline screen processing according to the embodiment of the present invention. Referring to FIG. 16, multiline screen processing is performed along the vertical direction.

Figure 17:
FIG. 17 shows a character original read by the digital copying machine according to the first embodiment of the present invention.
Figure 18:
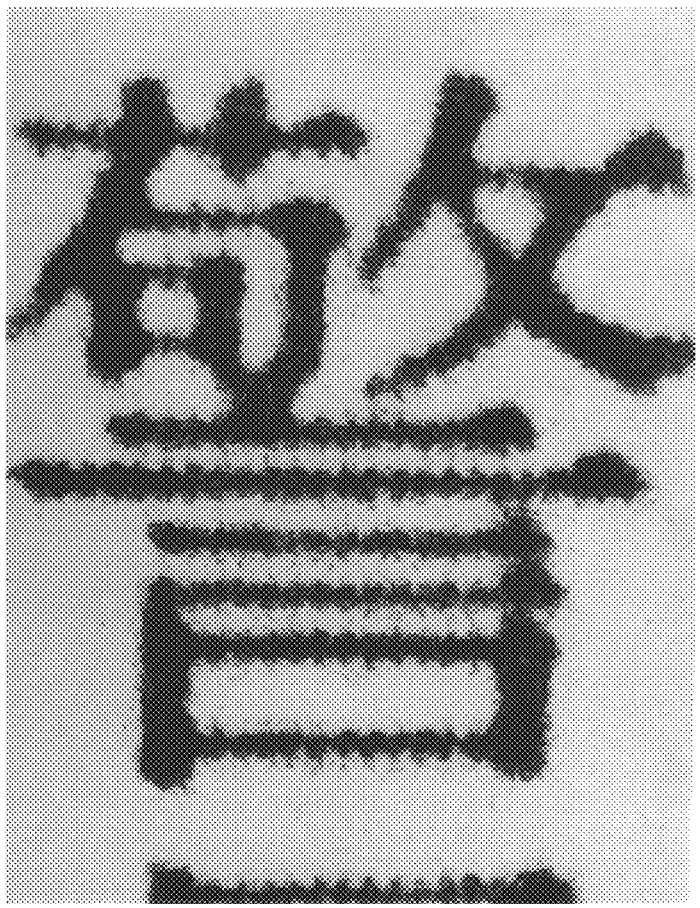
FIG. 18 shows an image to which the first embodiment of the present invention is applied for the original image shown in FIG. 17 with a horizontally set screen direction.
Figure 19:
FIG. 19 shows an image to which the first embodiment of the present invention is applied for the original image shown in FIG. 17 with a vertically set screen direction.

FIG. 17 shows an original which is read for showing the effect of the embodiment according to the present invention with respect to a character image. FIG. 18 shows an image obtained by rightwardly performing multiline screen processing on the original shown in FIG. 17 by the embodiment of the present invention, and FIG. 19 shows an image obtained by vertically performing multiline screen processing on the original by the embodiment of the present invention.

Figure 20:
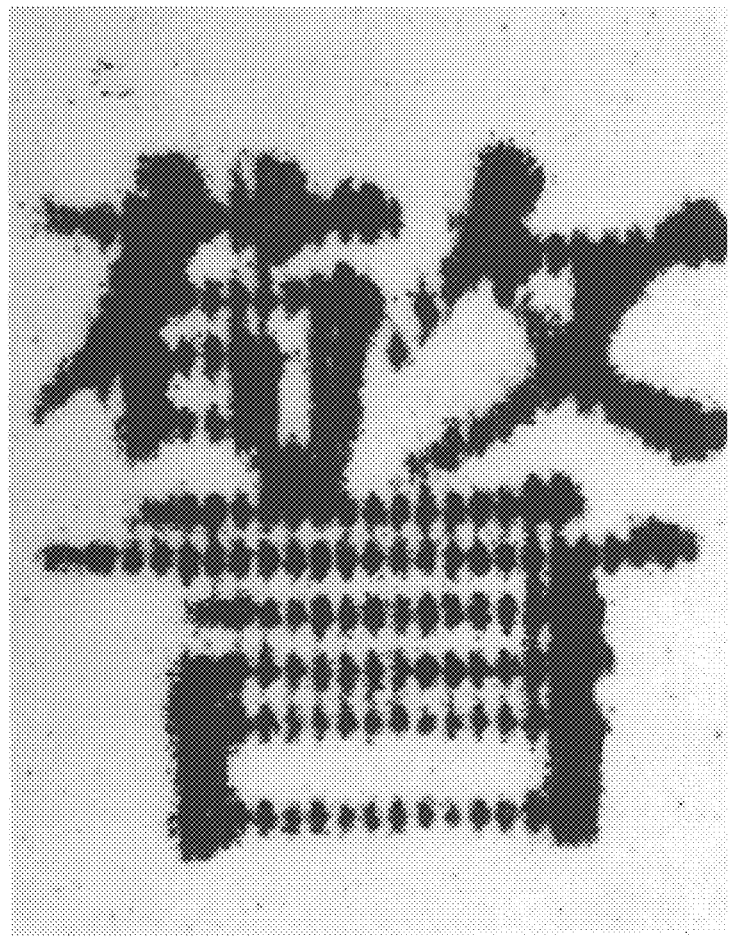
FIG. 20 shows an image which is formed by a conventional dither method for the original shown in FIG. 17.
Figure 21:
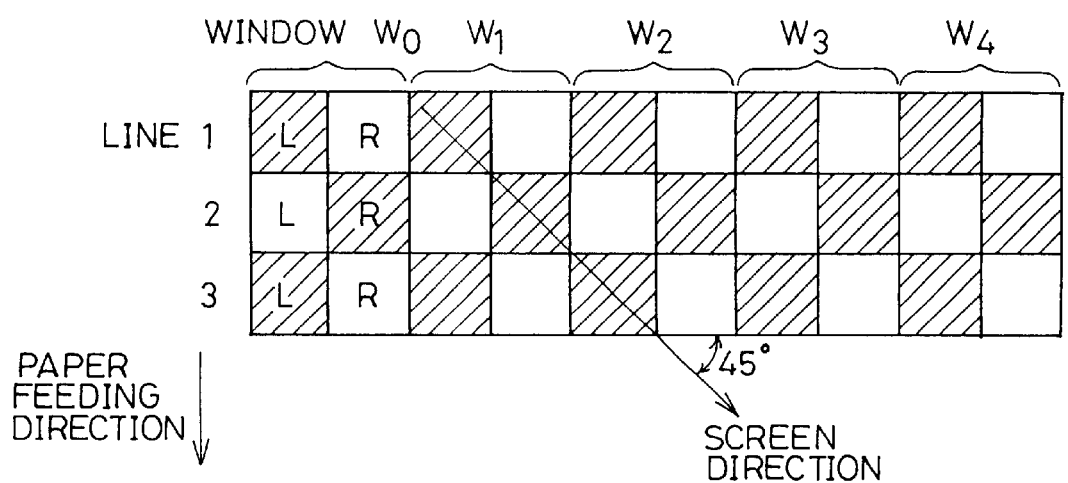
FIG. 21 shows a modification of the first embodiment of the present invention for illustrating a state of shifted density data in relations between window numbers and line numbers with a screen direction set at 45°.
Figure 23:
FIG. 23 shows an image corresponding to the modification shown in FIG. 21, with a screen direction set at 45°.

On the other hand, FIG. 20 shows an image obtained through a conventional method by applying the so-called dither method to the original shown in FIG. 17. Referring to FIG. 20, it is understood that data such as those of a character to be continuously reproduced are discontinuously reproduced by dither processing. According to the embodiment of the present invention, on the other hand, it is possible to reproduce an excellent image also with respect to a character image. FIG. 21 is a diagram corresponding to FIG. 11, with a multiline screen direction changed to a 45° direction. In more concrete terms, data of right picture elements R are shifted to left picture elements L among those forming windows W0 to W4 with respect to a line 1, while data of left picture elements L are shifted to right picture elements R with respect to a line 2. The data shift directions are varied with the odd and even numbers of the lines, so that the picture elements having enhanced densities are checkered at a screen angle of 45° among adjacent picture elements. FIG. 23 shows an image which is reproduced with respect to the original shown in FIG. 15 at this screen angle of 45°.

Figure 22:
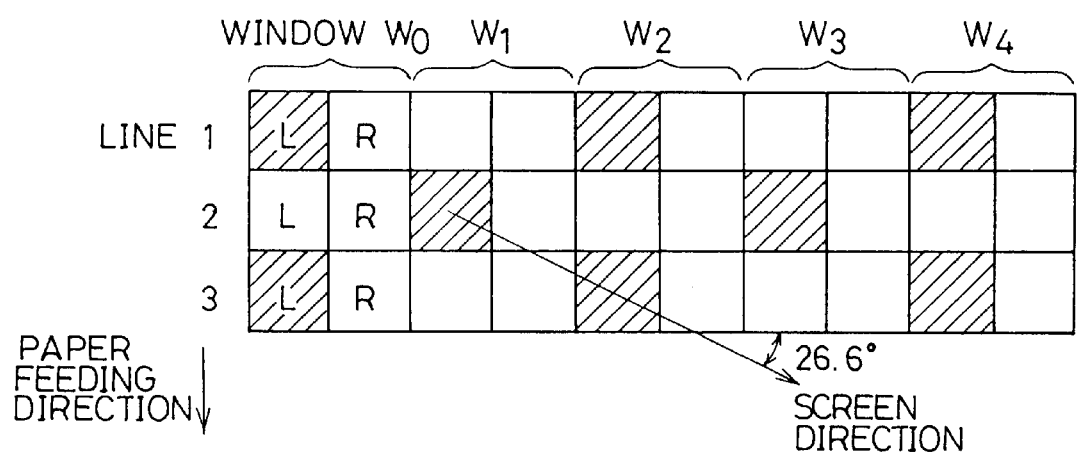
FIG. 22 shows another modification of the first embodiment of the present invention for illustrating a state of shifted density data in relations between window numbers and line numbers with a screen direction set at 26.6°.
Figure 24:
FIG. 24 shows an image corresponding to the modification shown in FIG. 22, with a screen direction set at 26.6°.

FIG. 22 shows another modification corresponding to FIG. 11, with further changed data shift directions. In this example, the image data are leftwardly shifted only in windows W0, W2 and W4, and no image data are shifted in windows W1 and W3 with respect to a line 1. On the other hand, image data are shifted in windows W1 and W3 and no data are shifted in windows W0, W2 and W4 with respect to a line 2. With respect to a line 3, further, image data are shifted similarly to the line 1, to form picture element patterns enhancing densities as shown in FIG. 22. As the result, the screen angle is 26.6°. FIG. 24 shows an image which is obtained by reading the original of FIG. 15 in the aforementioned manner.

Figure 25:
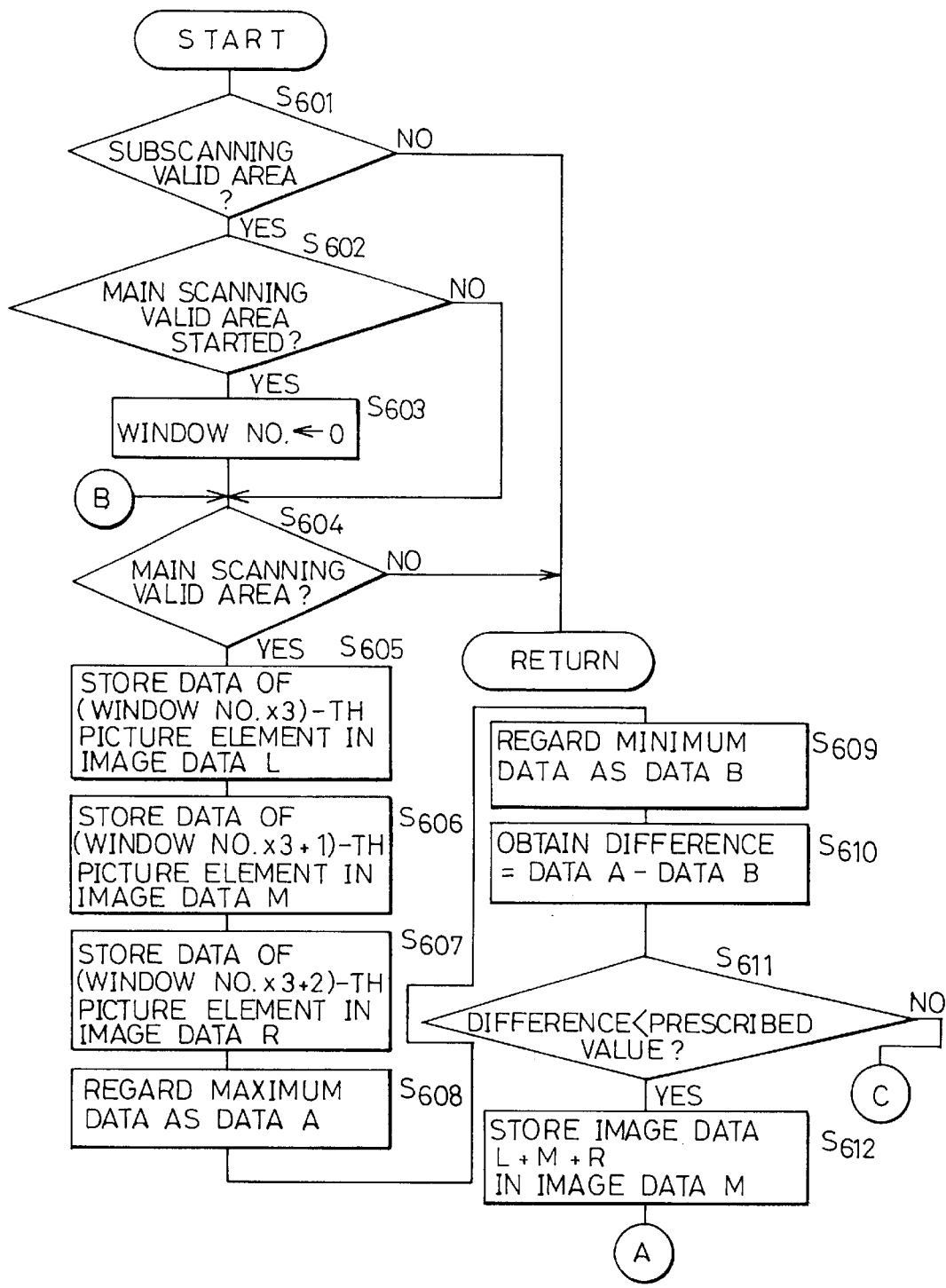
FIG. 25 is a part of a flow chart showing the content of control by a multiline screen processing processor according to a second embodiment of the present invention.
Figure 26:
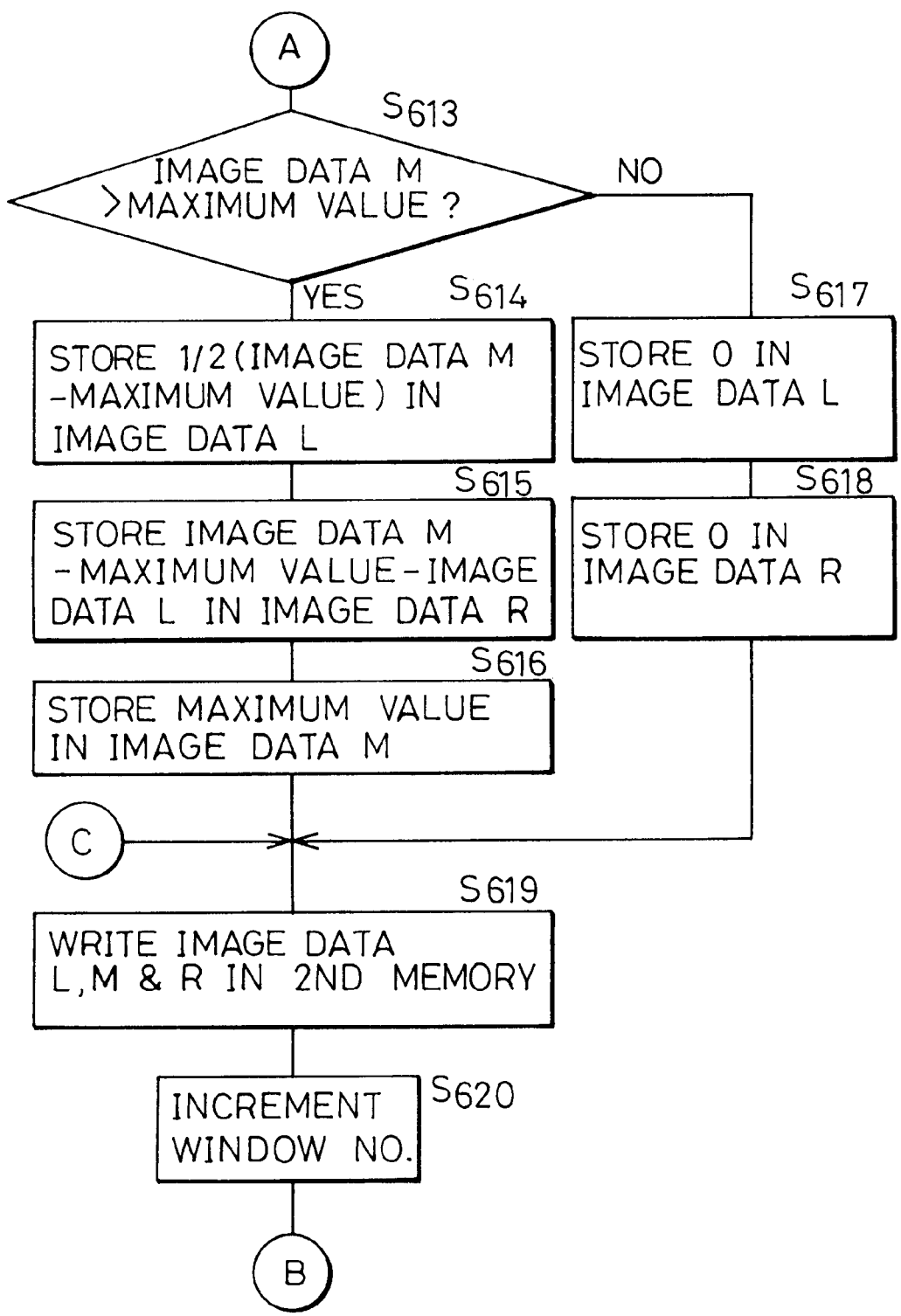
FIG. 26 is another part of the flow chart showing the content of control by the multiline screen processing processor according to the second embodiment of the present invention.

FIG. 25 is a flow chart showing the content of control by a multiline screen processing processor for processing three adjacent picture elements according to another embodiment of the present invention.

FIG. 27 concretely shows processing of shifting density data with respect to three adjacent picture elements.

Referring to (1) in FIG. 27, it is assumed that a central image data M, a left image data L adjacent thereto and a right image data R adjacent thereto have values appearing in this figure. Obtained in this case is a difference D between the image data having the maximum density data, i.e., the image data L in this example, and that having the minimum density data, i.e., the image data M in this example, among the three adjacent picture elements. When this difference D is smaller than a threshold value DTH, the density data of the left and right image data L and R are shifted to the central image data M. In this example, the value of the left image data L is superposed on that of the image data M, and the value of the right image data R is further superposed on the same. However, if all image data are superposed on the central image data M, the value of this data exceeds the maximum value of 255. Therefore, the excess over the maximum value is distributed to the values of the image data L and R.

When the difference D between the image data having the maximum and minimum density data among the adjacent three picture elements is larger than the threshold value DTH as shown at (2) in FIG. 27, on the other hand, no density data are shifted similarly to the aforementioned first embodiment, in order to prevent shifting of edges in a character image or the like.

Referring again to the flow chart shown in FIG. 25, steps S601 to S604 are identical to the steps S501 to S504 of the first embodiment, and hence redundant description is omitted.

At a step S605, data of a (window number×3)-th picture element is read from those stored in a first memory 250 and stored in an image data L.

According to this embodiment, each window number, which corresponds to three adjacent picture elements, is different from that of the first embodiment corresponding to two adjacent picture elements.

Then, data of a (window number×3+1)-th picture element is read from the first memory 250 and stored in an image data M at a step S606. In a similar manner, data of a (window number×3+2)-th picture element is read from the first memory 250 and stored in an image data R at a step S607. Then, the maximum data of those stored in the image data L, M and R is regarded as data A at a step S608, and the minimum one is regarded as data B at a step S609. Then, the difference between the data A and B is calculated at a step S610. At a step S611, a determination is made as to whether or not the difference is less than a prescribed value. If the determination is of yes, the flow is advanced to a step S612 for shifting the density data as shown at (1) in FIG. 27. If the determination is of no, on the other hand, the flow is advanced to a step S619 since no density data is shifted as shown at (2) in FIG. 27. At the step S619, the values of the image data L, M and R are directly outputted and stored in a second memory 251. At a step S620, the window number is incremented for performing processing on a next window, and the flow is returned to the step S604.

If the difference is less than the prescribed value at the step S611, on the other hand, a value obtained by adding up all values of the image data L, M and R is stored in the image data M at the step S612. Then, a determination is made at a step S613 as to whether or not the image data M is larger than the maximum value, i.e., 255. If the image data M is not larger than the maximum value, values of zero are stored in the image data L and R at steps S617 and S618 respectively, and then the flow is advanced to the step S619.

If the image data M exceeds the maximum value at the step S613, on the other hand, a value half that obtained by subtracting the maximum value from the image data M is stored in the image data L at a step S614. Then, a value obtained by subtracting the maximum value and the image data L from the image data M is stored in the image data R at a step S615. Further, the maximum value is stored in the image data M at a step S616. Namely, if the value obtained by adding up the density data of the adjacent three picture elements exceeds the maximum value, a value half the excess is distributed to the left and right image data L and R by the processing through the steps S614 to S616.

Thus, the values of the image data L, M and R are decided and outputted to the second memory 251 to be stored therein at the step S619. Then, the window number is incremented at a step S620 for processing picture elements corresponding to the next window, and thereafter the flow is returned to the step S604 to perform processing similar to the above.

While the multiline screen processing is performed in the main scanning direction in each of the first and second embodiments, it is also possible to perform this processing in the subscanning direction. However, the subscanning direction is easily influenced by an error in the rotation pitch of the photoreceptor drum, and hence the screen direction is preferably selected in the main scanning direction.

Further, while the threshold value for determining execution/non-execution of data shifting in the picture elements is set at a constant level in each of the first and second embodiments, such a threshold value can be varied with the state of the as-read image such as a half tone image or a character image, for example.

The threshold value is preferably about 80 in the case of 0 to 255 gradations. This value is set as about ⅓ of the black-and-white contrast of about 240.

While density data are shifted with respect to two or three adjacent picture elements in each of the first and second embodiments, further, it is possible to shift density data with respect to four or more picture elements, depending on the original image.

Further, while the present invention is applied to an image processing apparatus of an intensity modulation system in each of the first and second embodiments, the idea of the present invention can be also applied to a system other than the intensity modulation system, as a matter of course.

Although the upper limit of the density data is set at the maximum value of 255 in shifting of density data in each of the first and second embodiments, the upper limit may not necessarily be the maximum value but it is also possible to shift the density data while setting a value less than the maximum value as the upper limit.

Figure 32:
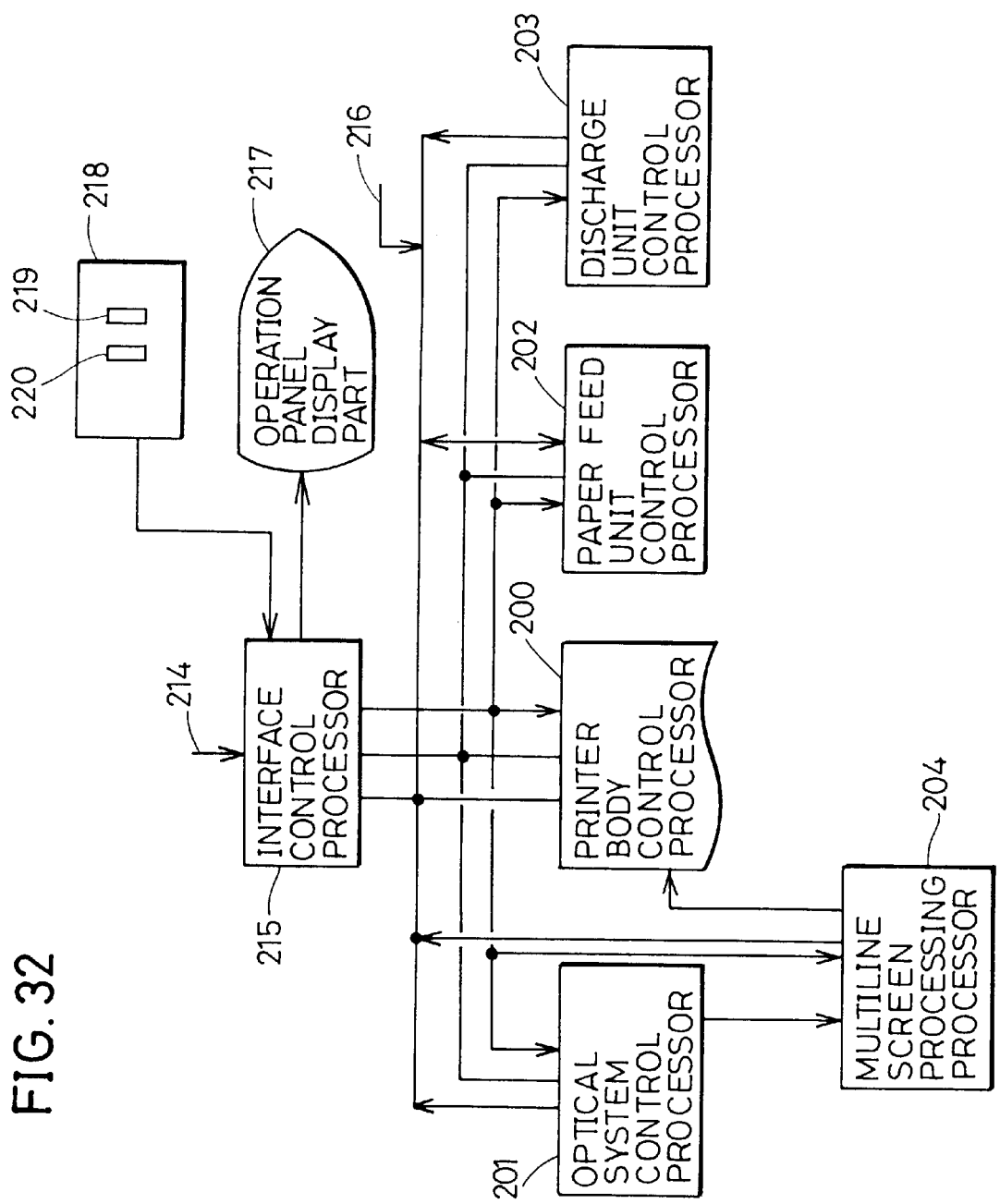
FIG. 32 is a block diagram showing the overall structure of the system of a digital copying machine according to a modification of the first or second embodiment of the present invention.

While the density data are processed with respect to two or three adjacent picture elements in each of the first and second embodiments, such processing may be enabled in a single digital copying machine. In this case, a switch 220 for switching the type of processing may be provided in an operating part 218 independently of a switch 219 as shown in FIG. 32, so that any processing can be specified.

Further, the switch 220 may be omitted and the switch 219 may be adapted to specify the processing mode for deciding whether multiline screen processing is performed on two picture elements or three picture elements. In other words, ordinary processing may be performed in a processing mode for an original which is mostly formed by a character and multiline screen processing may be performed on two picture elements in a processing mode for an original containing a character and a photograph, while multiline screen processing may be performed on three picture elements in a processing mode for an original which is mostly formed by a photograph.

Figure 28:
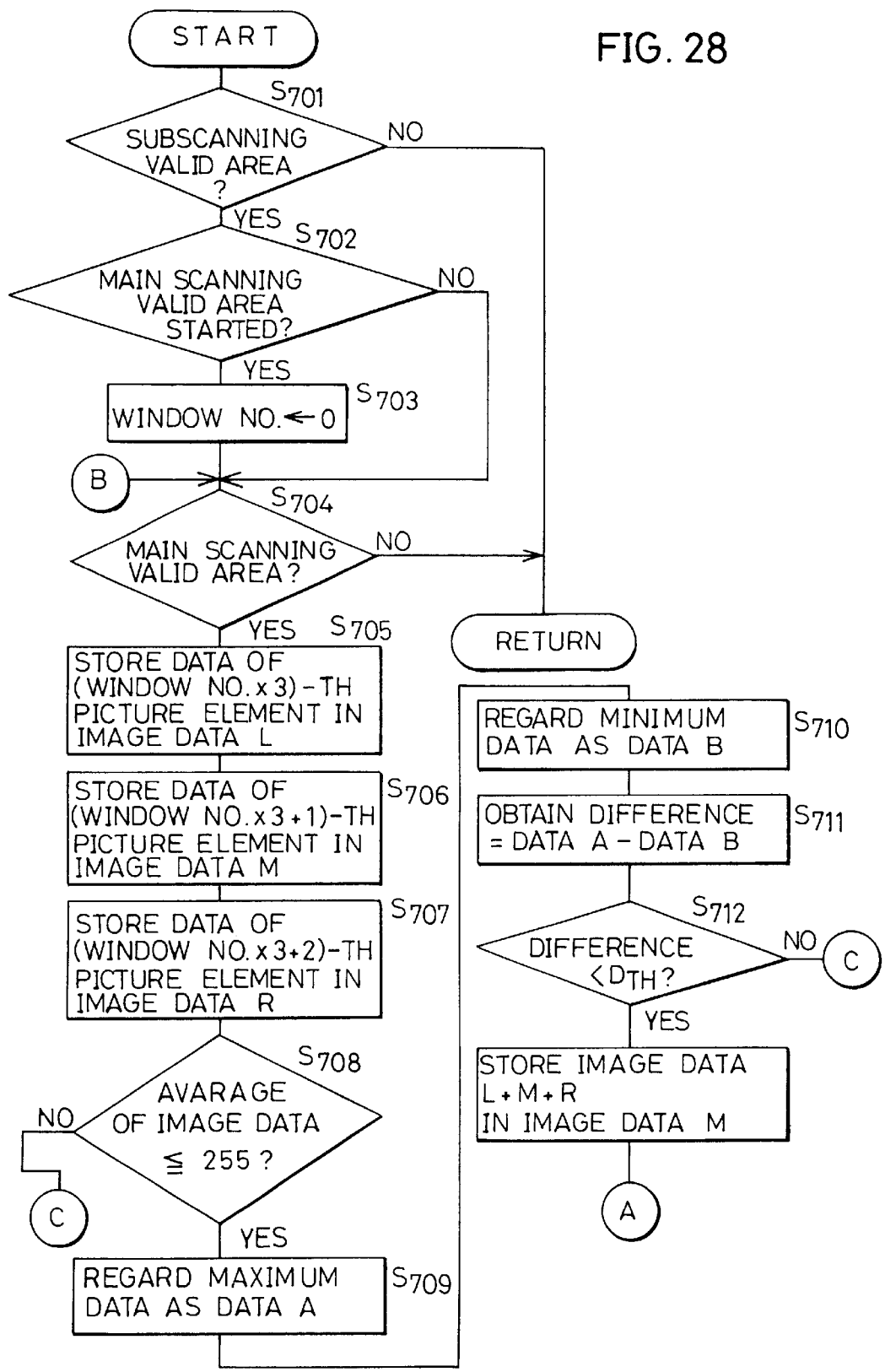
FIG. 28 is a part of a flow chart showing the content of control by a multiline screen processing processor according to a third embodiment of the present invention.
Figure 29:
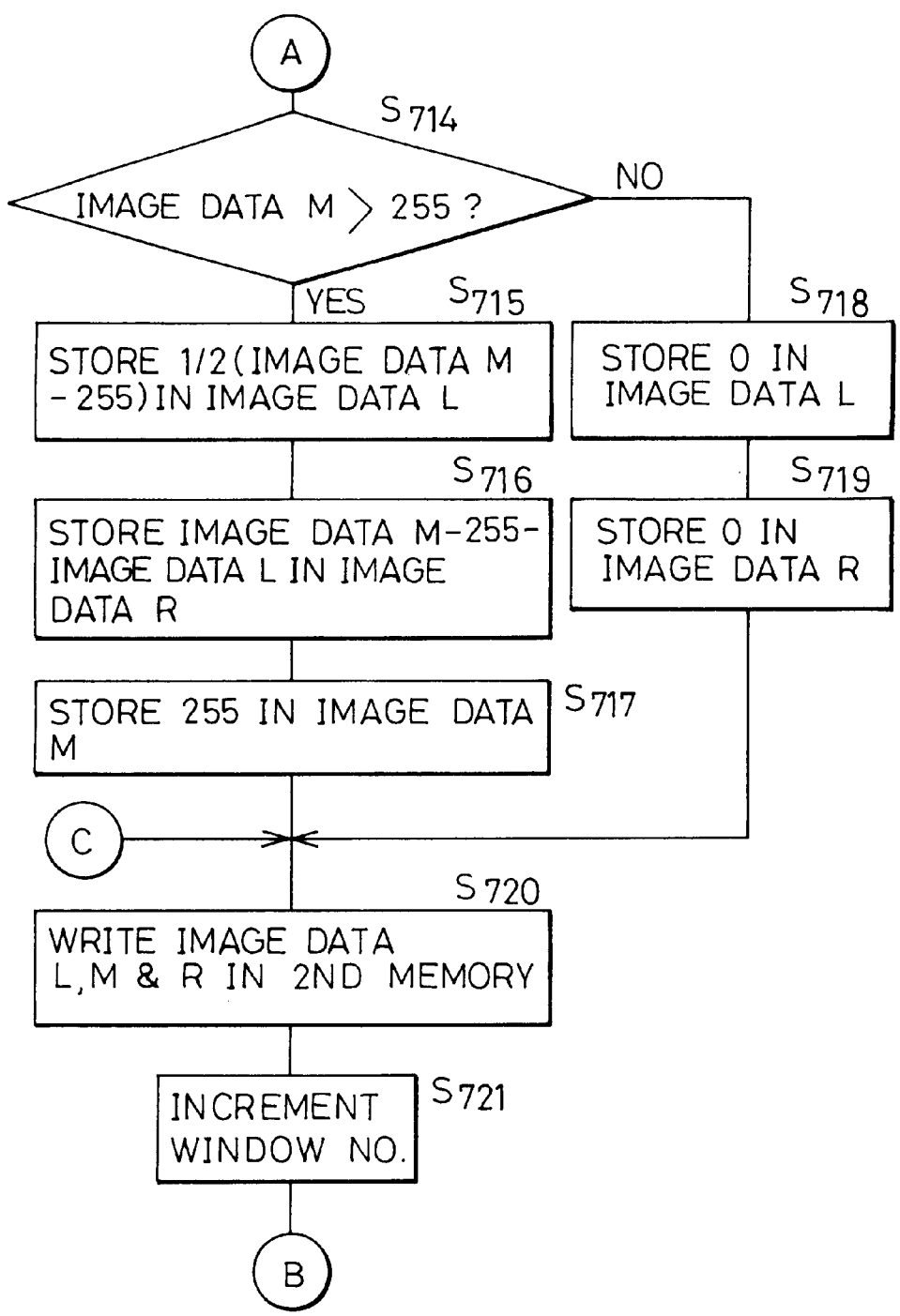
FIG. 29 is another part of the flow chart showing the content of control by the multiline screen processing processor according to the third embodiment of the present invention.

FIGS. 28 and 29 are flow charts showing the content of control by a multiline screen processing processor for performing multiline screen processing on three adjacent picture elements according to a third embodiment of the present invention.

Figure 30:
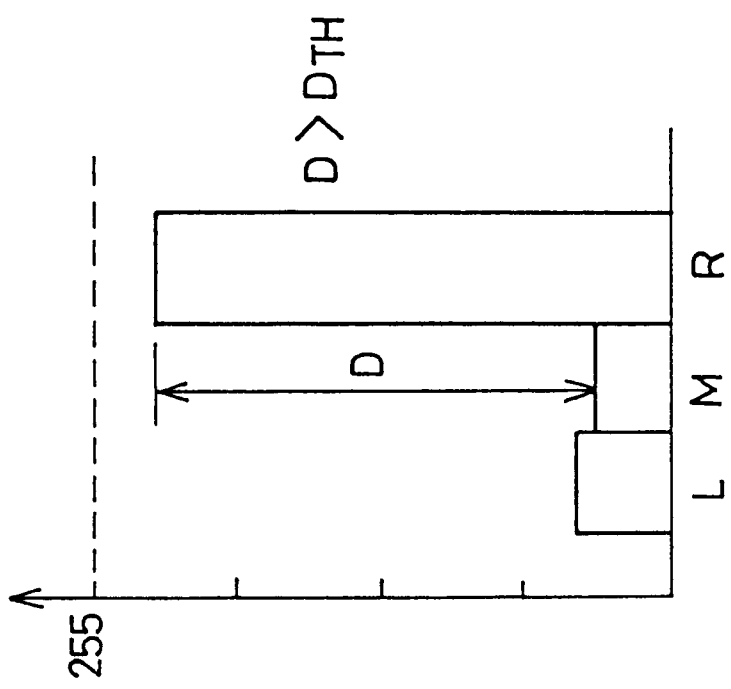
FIG. 30 schematically illustrates processing of shifting density data with respect to three adjacent picture elements according to the third embodiment of the present invention.
Figure 30:
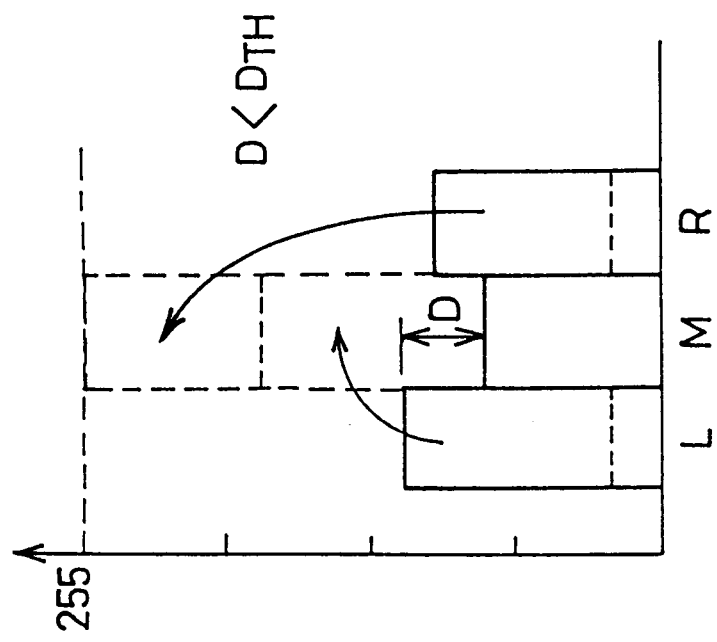

FIG. 30 concretely shows processing of shifting density data with respect to three adjacent picture elements.

It is assumed that a central image data M, a left image data L adjacent thereto and a right image data R adjacent thereto have values shown at (1) in FIG. 30. Obtained in this case is a difference D between the image data having the maximum density data, i.e., the image data L in this example, and that having the minimum density data, i.e., the image data M in this example, among the three adjacent picture elements. When the difference D is smaller than a second prescribed value DTH, the density data of the left and right image data L and R are shifted to the central image data M. In this example, the value of the left image data L is superposed on that of the central image data M, and the value of the right image data R is further superposed on the same. When all image data are superposed on the central image data M, however, the value of this data exceeds the maximum value 255. Therefore, the excess over the maximum value is equally distributed as the image data L and R.

When the data D between the values of the picture elements having the maximum and minimum density data is larger than the second prescribed value DTH among the three adjacent picture elements as shown at (2) in FIG. 30, on the other hand, no density data are shifted similarly to the first and second embodiments, in order to prevent shifting of edges in a character image or the like.

Referring again to the flow chart shown in FIG. 28, steps S701 to S704 are similar to the steps S501 to S504 of the first embodiment, and hence redundant description is not repeated.

At a step S705, data of a (window number×3)-th picture element is read from those stored in a first memory 250 and stored in an image data L.

According to this embodiment, each window number, which corresponds to three adjacent picture elements, is different from that of the first embodiment corresponding to two adjacent picture elements.

Then, data of a (window number×3+1)-th picture element is read from the first memory 250 and stored in an image data M at a step S706. Similarly, data of a (window number×3+2)-th picture element is read from the first memory 250 and stored in an image data R at a step S707. Then, an average value of the three image data L, M and R is compared with the maximum value (first prescribed value) of 255 of the density data at a step S708. If the average value is less than 255, the flow is advanced to a next step S709. If the average value is larger than 255, on the other hand, the flow is advanced to a step S720 while performing no multiline screen processing.

Then, the maximum one of the data stored in the image data L, M and R is regarded as data A at a step S709, and the minimum one is regarded as data B at a step S710. Then, the difference between the data A and B is calculated at a step S711. At a step S712, a determination is made as to whether or not the difference is less than a second prescribed value DTH shown in FIG. 30. If the difference is less than the prescribed value DTH, the flow is advanced to a step S713 for shifting the density data as shown at (1) in FIG. 30, while the flow is advanced to a step S720 if the difference is not less than the prescribed value DTH, since no density data are shifted as shown at (2) in FIG. 30. At the step S720, the values of the image data L, M and R are directly outputted and stored in a second memory 251. At a step S721, the window number is incremented for performing processing on a next window, and the flow is returned to the step S704.

When the difference is less than the prescribed value DTH at the step S712, a value obtained by adding up the values of the image data L, M and R is stored in the image data M at the step S713. Then, a determination is made at a step S714 as to whether or not the image data M is larger than the maximum value, i.e., 255. If the determination is of no, values of zero are stored in the image data L and R at steps S718 and S719 respectively, and thereafter the flow is advanced to a step S720.

If the image data M exceeds the maximum value 255 at the step S714, on the other hand, a value half that obtained by subtracting the maximum value 255 from the image data M is stored in the image data L at a step S715. Then, a value obtained by subtracting the maximum value 255 and the image data L from the image data M is stored in the image data R at a step S716. Further, the maximum value 255 is stored in the image data M at a step S717. Namely, if the total sum of the density data of the three adjacent picture elements exceeds the maximum value 255, a value half the excess is equally distributed to the left and right image data L and R by the processing through the steps S715 to S717.

Thus, the values of the image data L, M and R are decided and outputted to the second memory 251 at a step S720, to be stored therein. Then the window number is incremented at a step S721 for processing picture elements corresponding to the next window, and the flow is returned to the step S704 to perform processing similar to the above.

Figure 31:
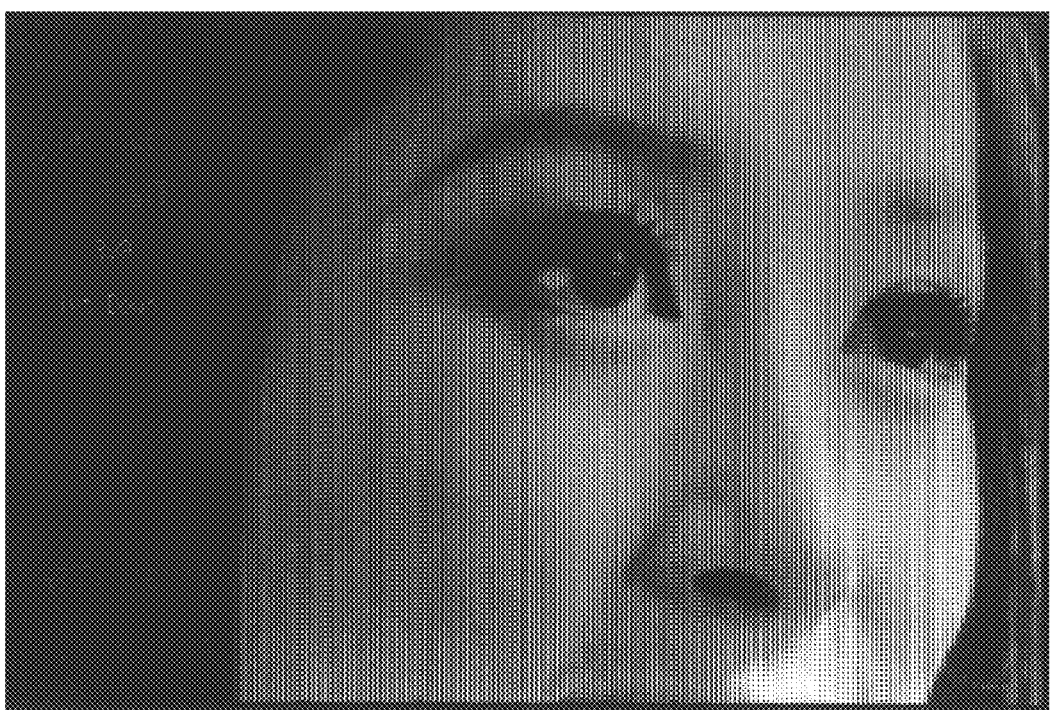
FIG. 31 shows an image formed by the third embodiment of the present invention with respect to the original image shown in FIG. 15.

FIG. 31 shows an image which is formed according to the third embodiment of the present invention with respect to the original image shown in FIG. 15.

When multiline screen processing is uniformly performed with no regard to the type of the original, a character part of an original containing a photographic image and a character image, for example, is unpreferably influenced by pattering through the multiline screen processing. In order to prevent this, the type of the original image may be judged to switch the processing. In this case, however, the processing is abruptly changed at a boundary portion between different types (areas) of images, leading to an unsightly reproduced image.

Figure 33:
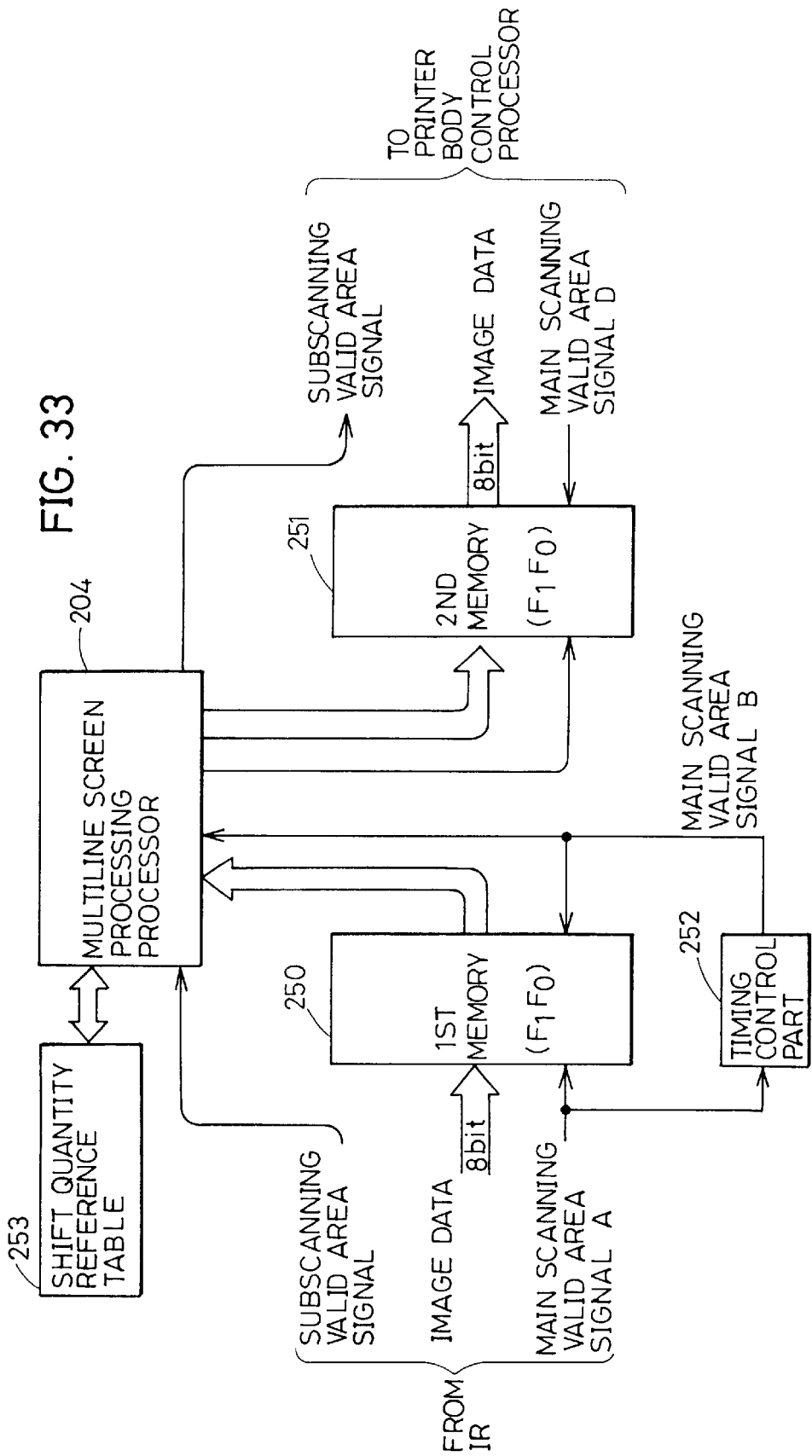
FIG. 33 is a system block diagram showing a structure around a multiline screen processing processor according to a fourth embodiment of the present invention.

FIG. 33 is a system block diagram showing a structure around a multiline screen processing processor according to a fourth embodiment of the present invention for solving such a problem.

Figure 34:
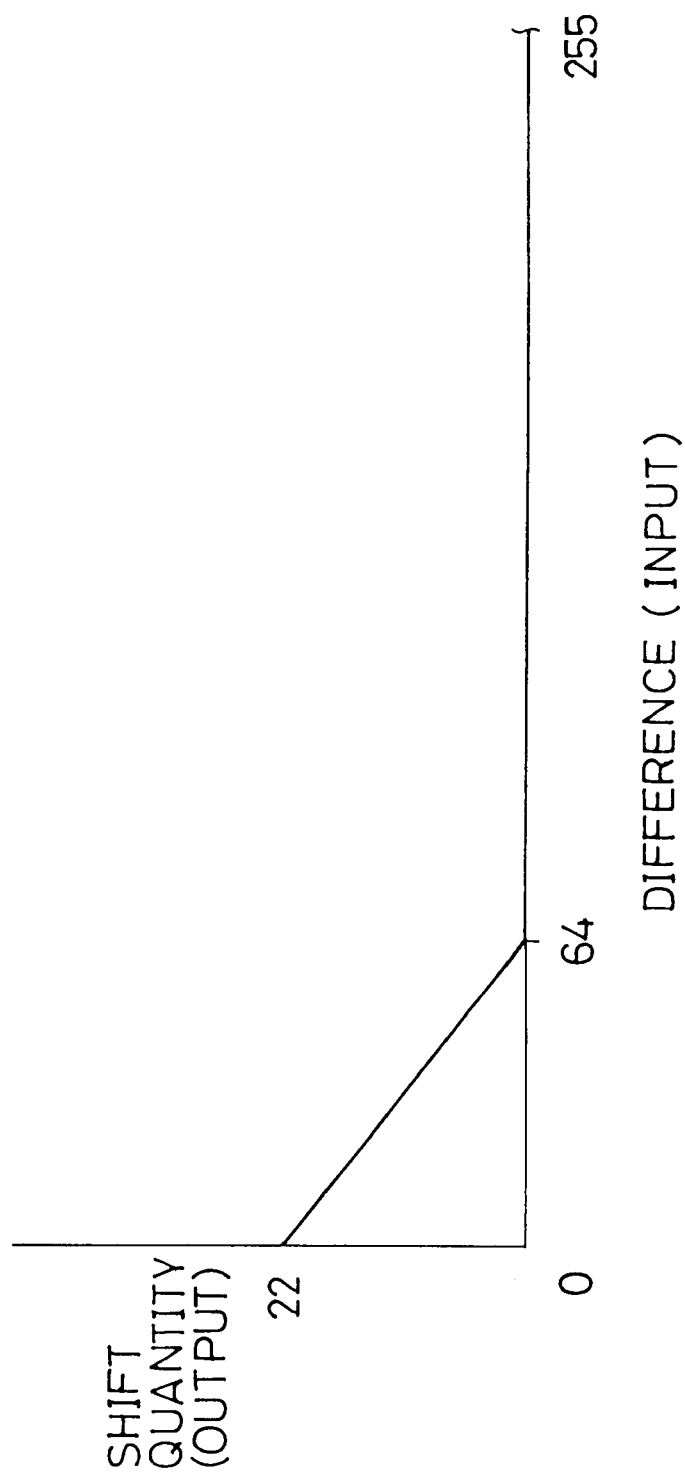
FIG. 34 illustrates the content of a shift quantity reference table employed in the fourth embodiment of the present invention.

Referring to FIG. 33, this system is basically identical to that of the first embodiment shown in FIG. 5, except that a shift quantity reference table 253 is provided. As hereinafter described, this shift quantity reference table 253 sets the quantity of shifting of density data in multiline screen processing, in response to a difference between density data of two adjacent picture elements. FIG. 34 shows the content thereof. Referring to FIG. 34, the axis of abscissas shows the difference between the density data as input, while the axis of ordinates shows the shift quantity corresponding to the difference as output.

Figure 35:
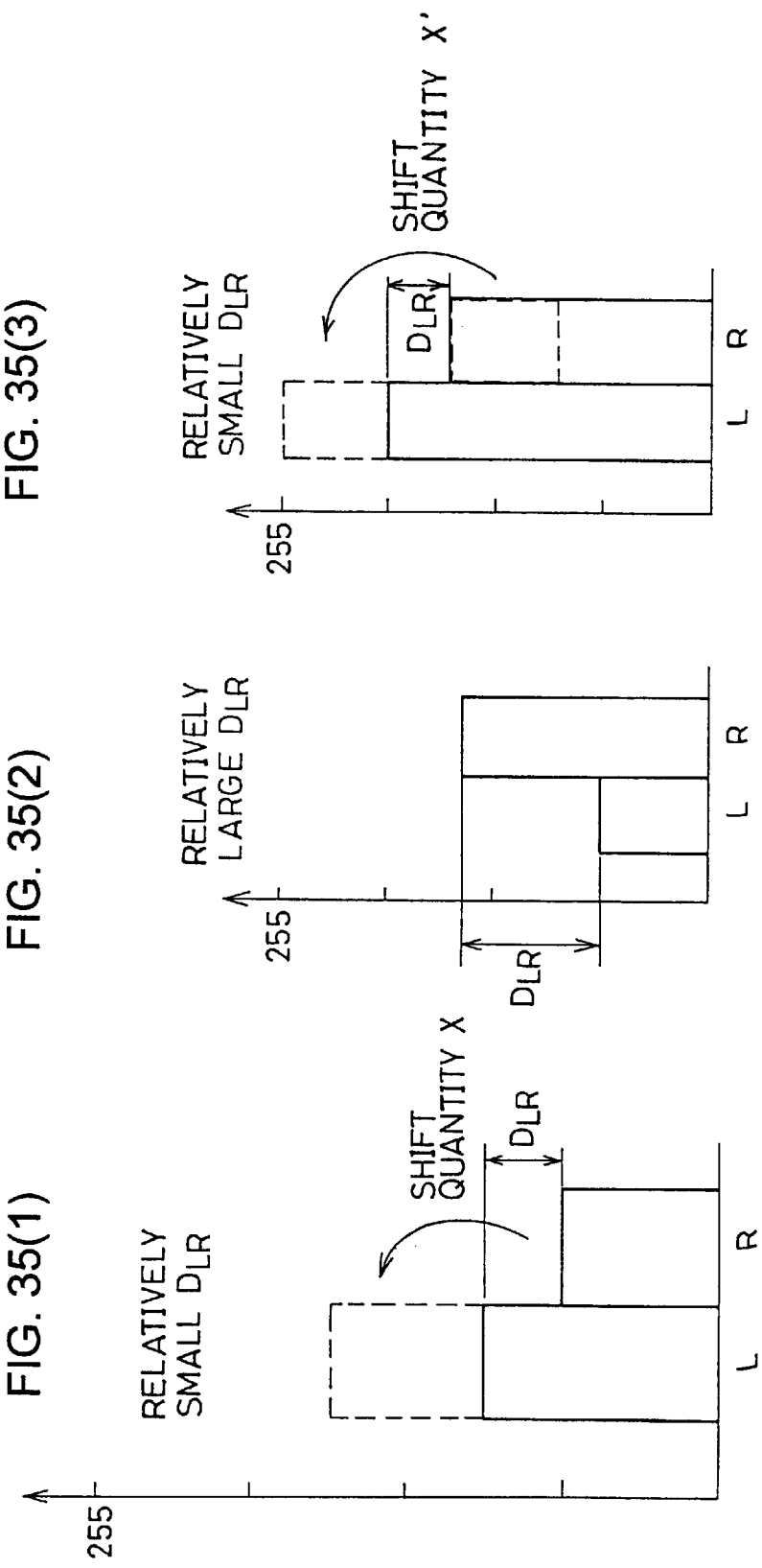
FIG. 35 schematically illustrates processing of density data for respective picture elements in the fourth embodiment of the present invention.

FIG. 35 schematically illustrates processing of density data for respective picture elements in the fourth embodiment of the present invention.

The basic idea of density data processing according to this embodiment is shown at (1) in FIG. 35. Referring to this figure, the axis of ordinates shows density levels of 256 gradations (0 to 255), while the axis of abscissas shows left and right density data L and R of a certain window. In this example, the density value of the left density data is larger by a difference DLR than that of the right density data R. A multiline screen processing processor 204 obtains density data shift quantity X corresponding to this difference DLR by data access to the reference table 253, to shift the value of the right density data R to the left density data L as shown by broken lines. In this example, the value of the left density data L is increased to a position shown by broken lines as the result, and the value of the right density data R is zeroed.

Processing for a large difference DLR between left and right density data L and R is shown at (2) in FIG. 35. In this case, no density data is shifted dissimilarly to that shown at (1) in FIG. 35, since positions of edge portions are moved in an image such as character data clearly showing the edge portions, for example, to lead to unpreferable image reproducibility. In this case, a shift quantity X corresponding to the difference DLR is set at zero, as shown in FIG. 34.

Still another example of image data shifting is shown at (3) in FIG. 35. In this example, the density data is basically shifted as shown at (1), since a difference DLR between left and right density data L and R is small. If the data is entirely shifted by the value of the shift quantity X shown in the shift quantity reference table 253 shown in FIG. 34, however, the left density data L exceeds the maximum value 255 since this data has a large value. In this case, a shift quantity X' is determined as shown by broken lines to set the upper limit of the left density data L at the maximum value 255. Thus, the value of the left density data L reaches the maximum value of 255 as the result of shifting, while the value of the right density data R is not zeroed but this data remains as in the position shown by broken lines. Thus, the quantity of toner adhesion is maximized in a picture element corresponding to the left density data L, while the density levels of the overall picture elements forming this window are maintained.

Figure 36:
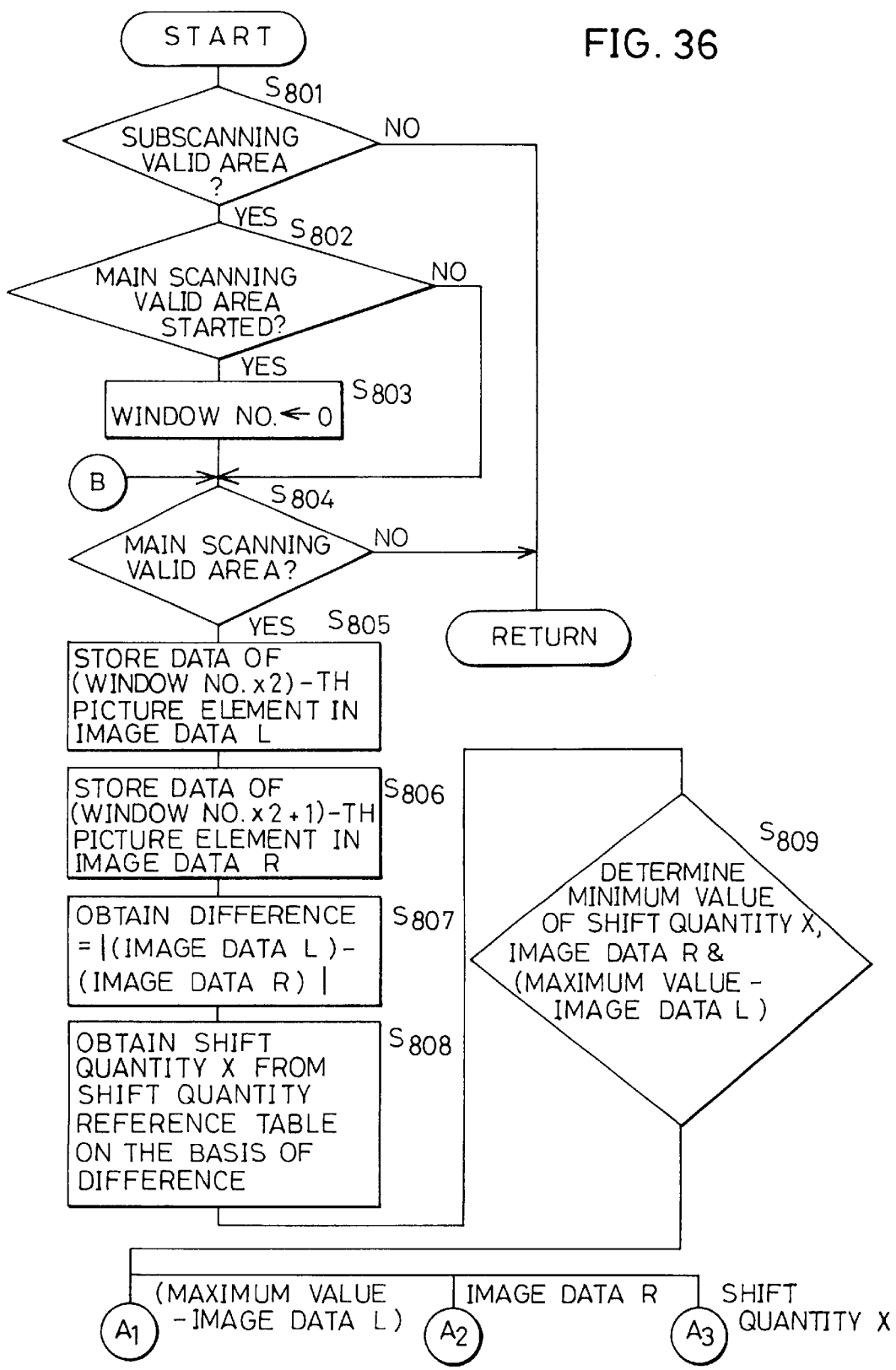
FIG. 36 is a part of a flow chart showing the content of control by a multiline screen processing processor according to the fourth embodiment of the present invention.
Figure 37:
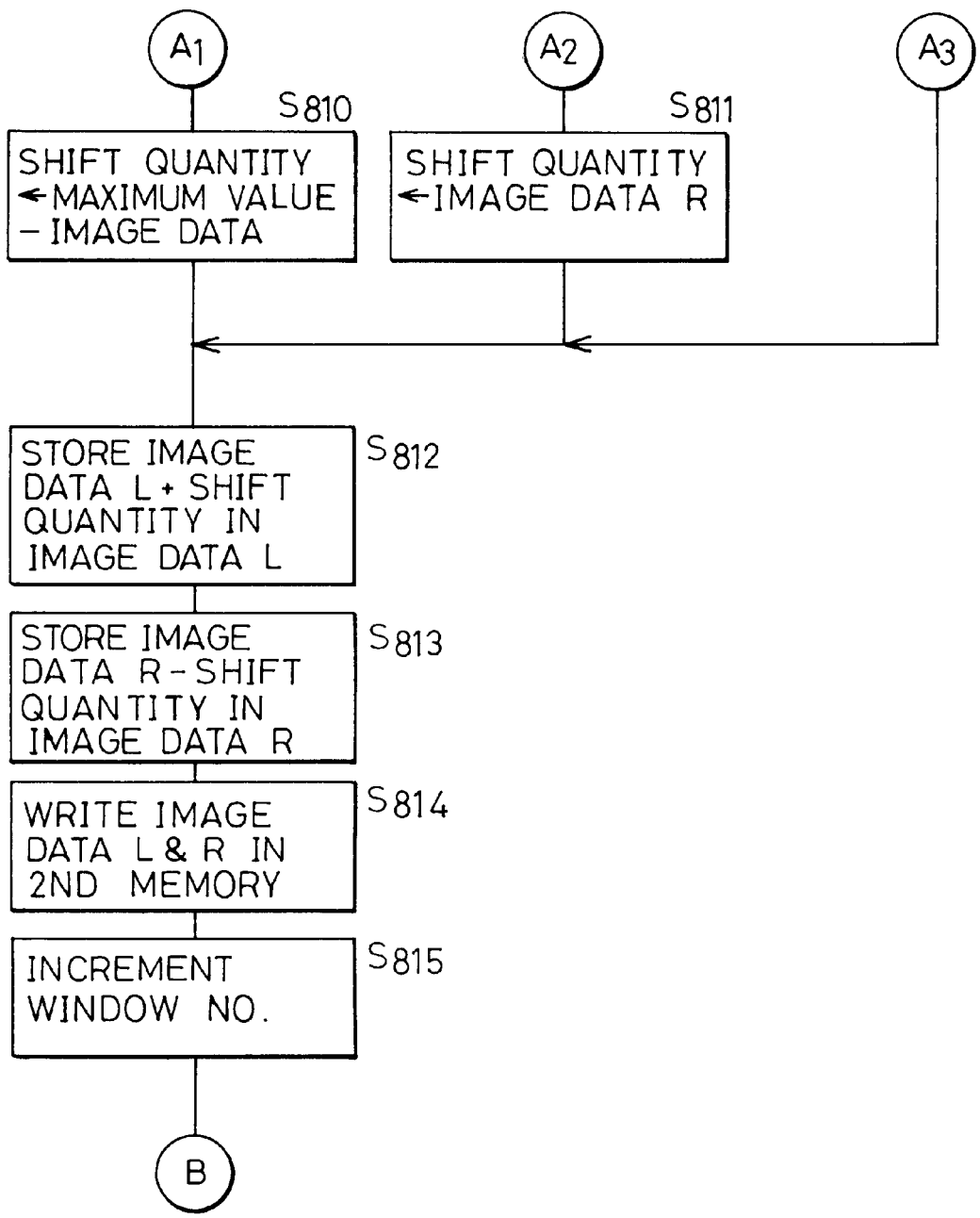
FIG. 37 is another part of the flow chart showing the content of control by the multiline screen processing processor according to the fourth embodiment of the present invention.

FIGS. 36 and 37 are flow charts showing the processing according to the fourth embodiment. Steps S801 to S807 are identical to the steps S501 to S507 of the first embodiment shown in FIG. 7, and hence redundant description is not repeated.

On the basis of a difference obtained at the step S807, a shift quantity X for a corresponding difference is selected from the shift quantity reference table 253 shown in FIG. 34. Then, the minimum value of the shift quantity X, the image data R and (maximum value−image data L) is determined at a step S809, so that the flow is advanced to the following steps.

This determination is made since it is necessary to obtain a value which can be actually shifted between adjacent picture elements. If the shift quantity X decided by the difference between two picture elements is smaller than the value of the image data R, the shift quantity X may be directly employed for processing. If the shift quantity X is larger than the value of the image data R, however, the image data R has a minus value in processing and the entire density cannot be maintained as the result.

Also as to the image data L to which the data is shifted, the overall density of the two adjacent picture elements cannot be maintained if the value is shifted in excess of its maximum value. Thus, the steps S810 and S811 are carried out for regarding the minimum value determined at the step S809 as the actual shift quantity.

At a step S812, a value obtained by adding up the image data L and the shift quantity is stored in the image data L, while a value obtained by subtracting the shift quantity from the image data R is stored in the image data R at a step S813. The image data L and R decided at the steps S812 and S813 are outputted to a second memory 251 at a step S814 to be stored in the same, and then the window number is incremented at a step S815 so that the flow is returned to the step S804, similarly to the first embodiment.

In order to process an original containing a half tone image such as a photographic image, it may be desirable not only to improve graininess of the half tone portion but to change the tone such as highlight enhancement or shadow enhancement for outputting the image, while exerting no influence on a character image by the tone control.

Figure 38:
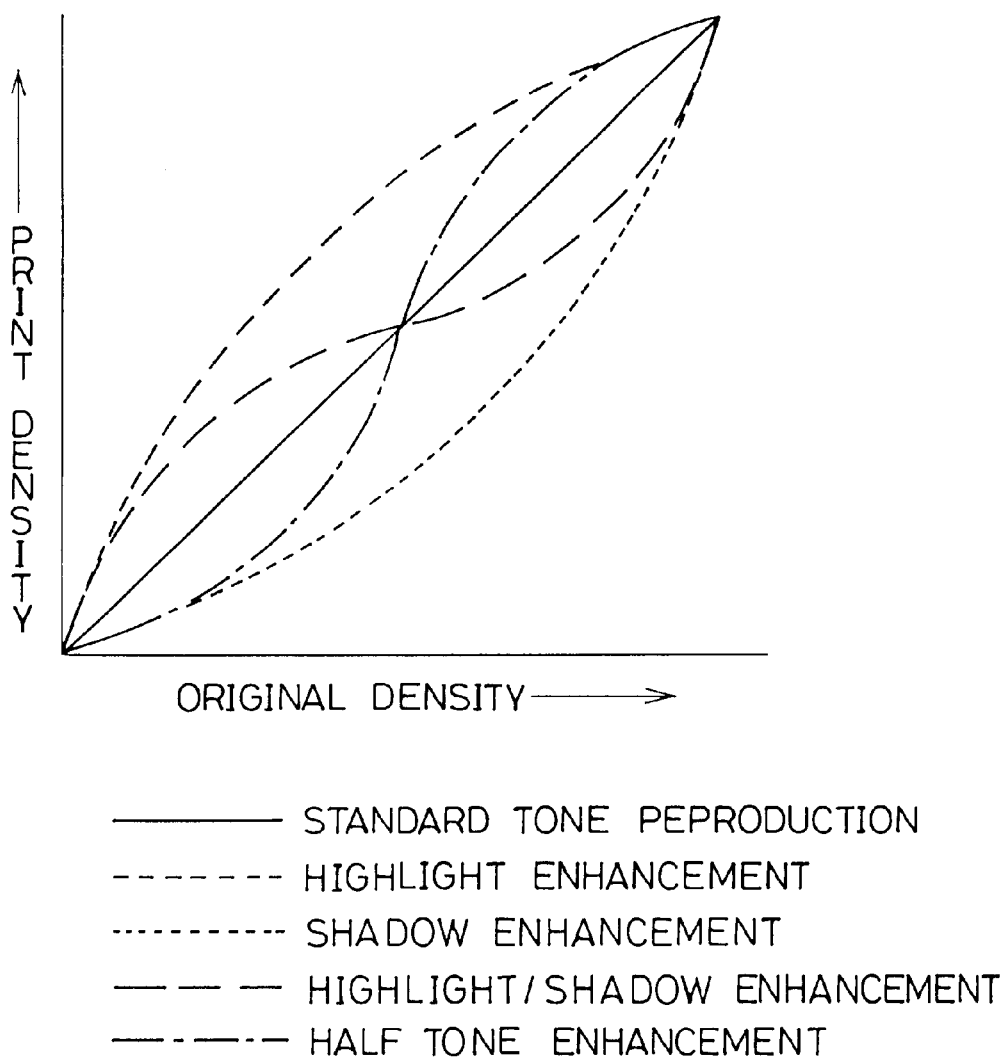
FIG. 38 shows the relation between original density and print density for illustrating the feature of a fifth embodiment of the present invention.

FIG. 38 shows the relation between original density and print density employed for controlling the tone of a half tone image in printing, for illustrating the feature of a fifth embodiment of the present invention for solving the aforementioned problem.

FIG. 38 shows curves corresponding to various gradation reproduction characteristics.

Figure 39:
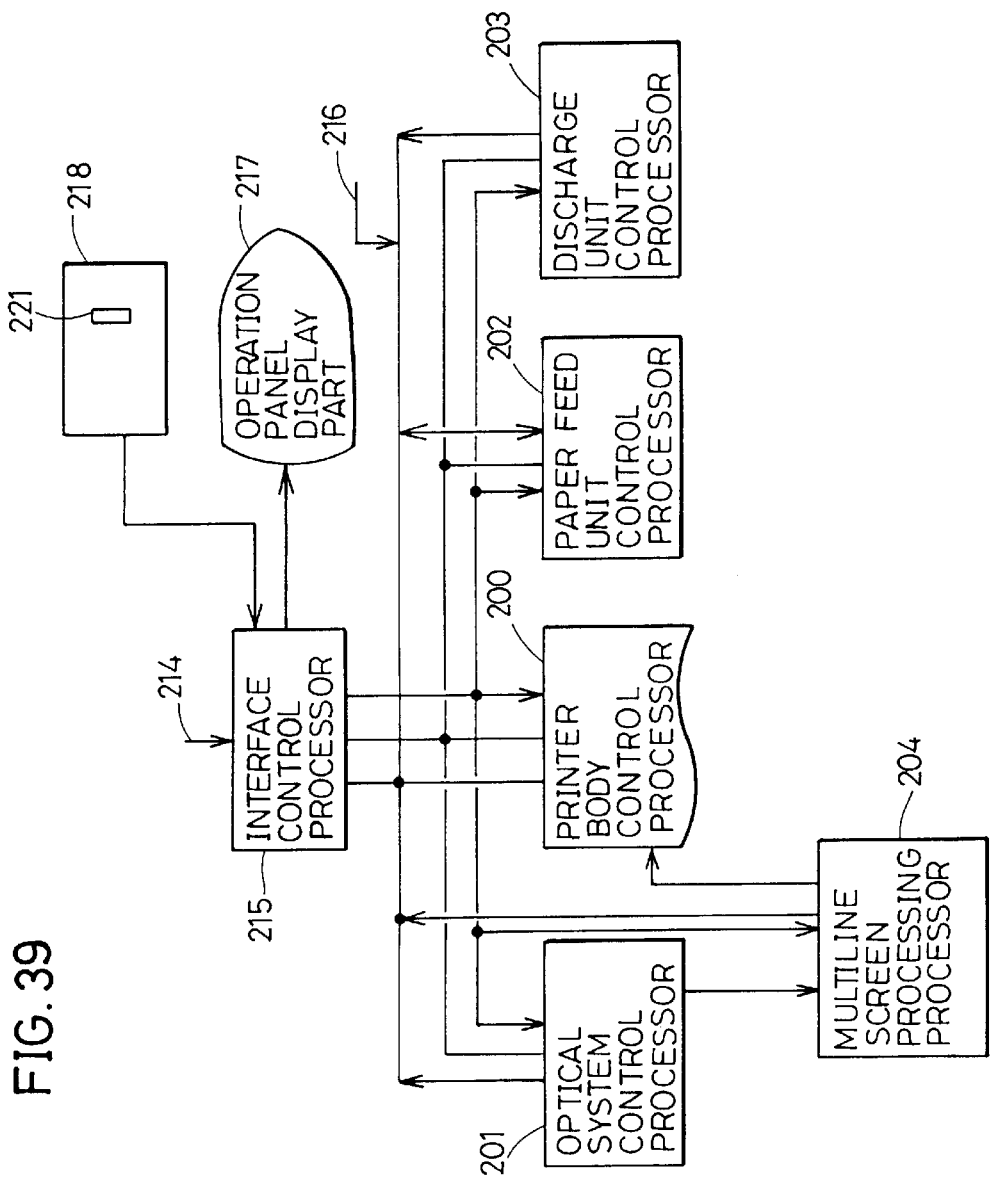
FIG. 39 is a block diagram showing the overall structure of a digital copying machine according to the fifth embodiment of the present invention.
Figure 40:
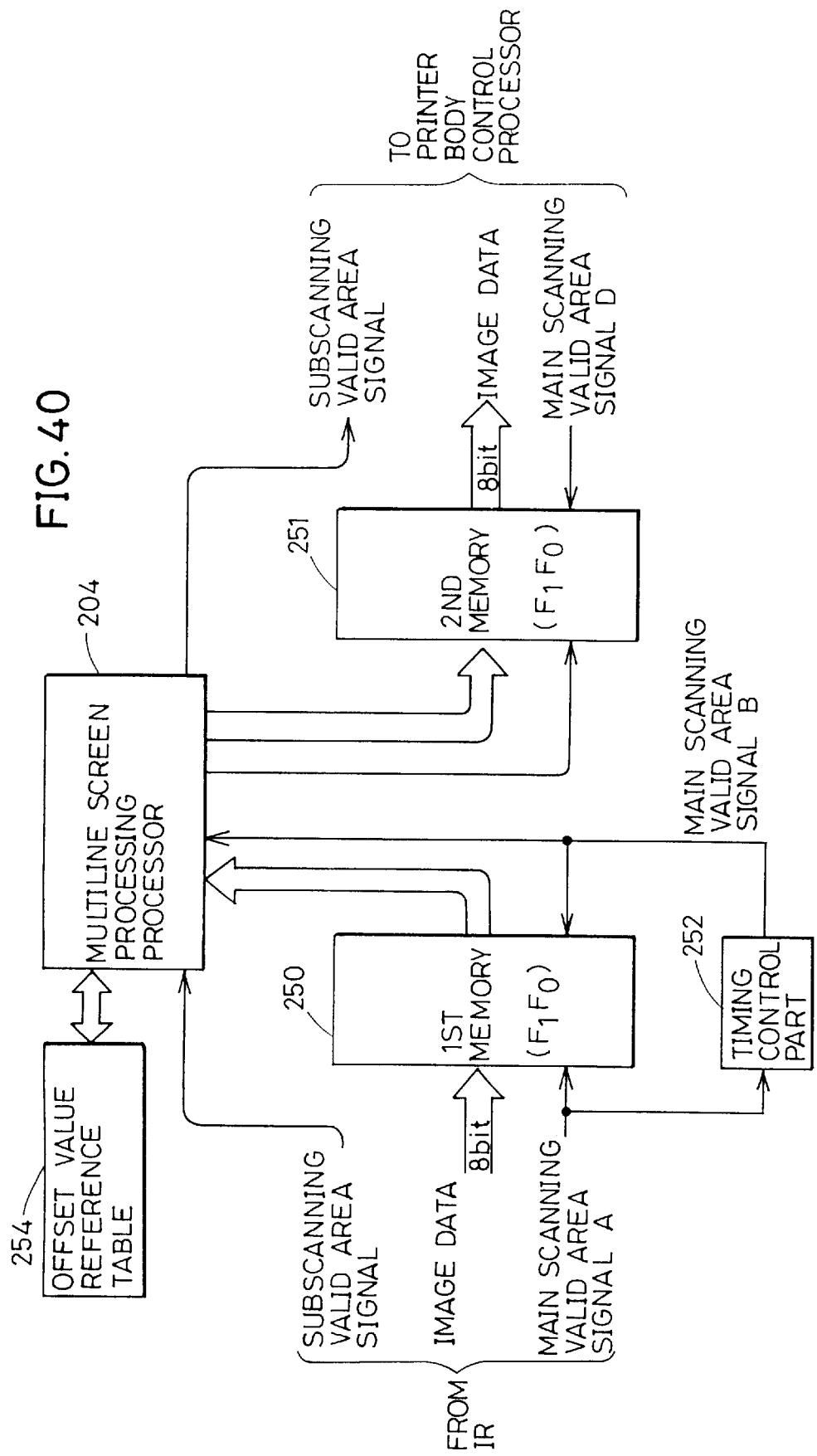
FIG. 40 is a system block diagram showing a structure around a multiline screen processing processor according to the fifth embodiment of the present invention.

According to this embodiment, standard tone reproduction data shown in FIG. 38 are inputted from an image reader IR or an external device. A tone specifying switch 221 of an operating part 218 shown in FIG. 39 is employed to correct image output data with an offset value corresponding to a curve of previously set tone, to thereafter perform multiline screen processing. Offset values corresponding to the respective curves are stored in an offset value reference table 254 shown in FIG. 40.

Figure 41:
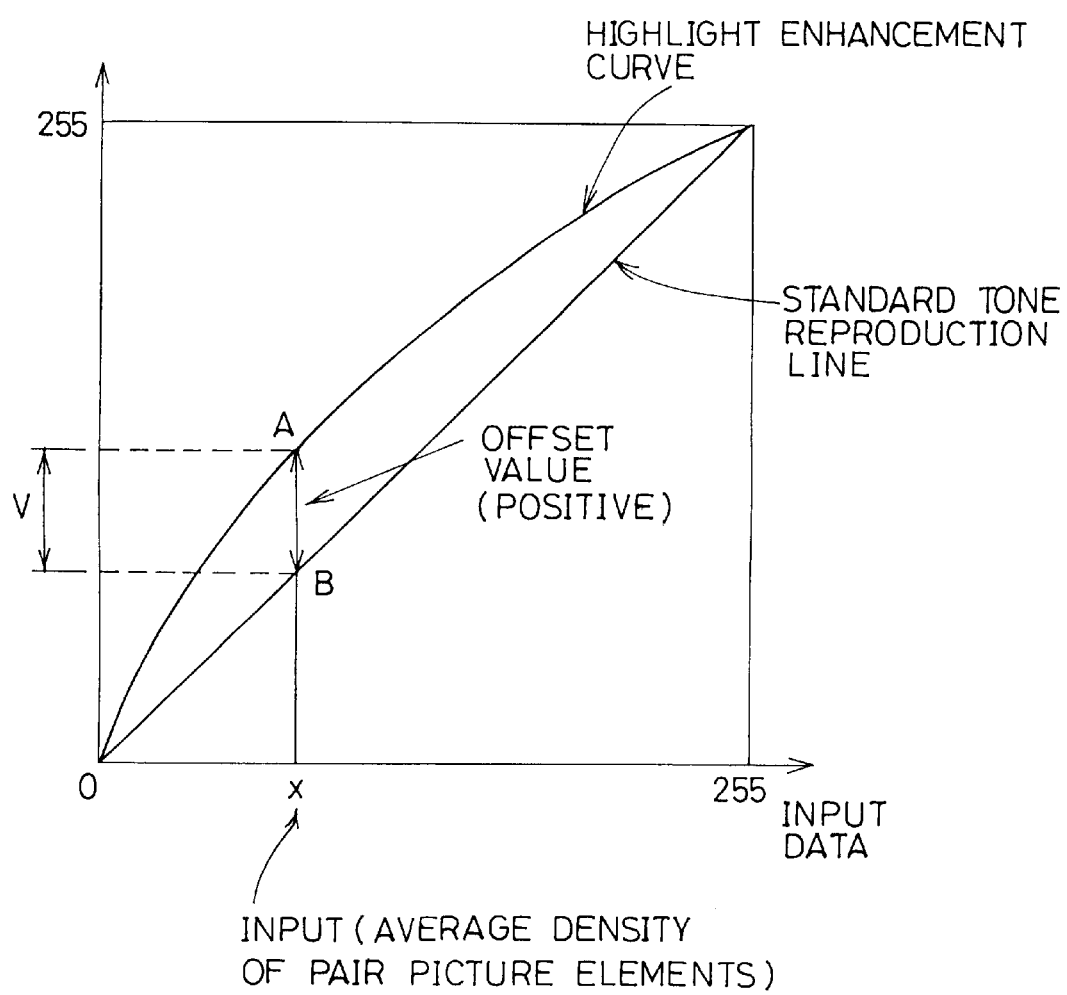
FIG. 41 is a diagram for illustrating a method of obtaining an offset value with reference to highlight enhancement in gradation reproduction characteristics shown in FIG. 38.

FIG. 41 is a diagram for illustrating a method of obtaining an offset value for a highlight enhancement curve in the gradation reproduction characteristics shown in FIG. 38, for example.

Referring to FIG. 41, it is assumed that an average density of two adjacent picture elements is x as input data. In this case, a difference between a point A of the highlight enhancement curve and a point B of a standard tone reproduction line corresponding to the input data x is obtained as an offset value V. According to the gradation characteristics of the highlight enhancement curve, the offset value is positive as clearly understood from FIG. 41.

FIG. 42 shows an original of image processing according to the fifth embodiment of the present invention, with reference to tone control by highlight enhancement in correspondence to FIG. 41.

It is assumed that density data of two adjacent picture elements are obtained from the image reader IR as shown at (1) in FIG. 42, with an average value x. The offset value V obtained as shown in FIG. 41 is added to the density data of the respective picture elements as shown at (2) in FIG. 42. The multiline screen processing described above with reference to the first embodiment is performed on the density data subjected to such offset correction in highlight enhancement, as shown at (3) in FIG. 42.

Figure 43:
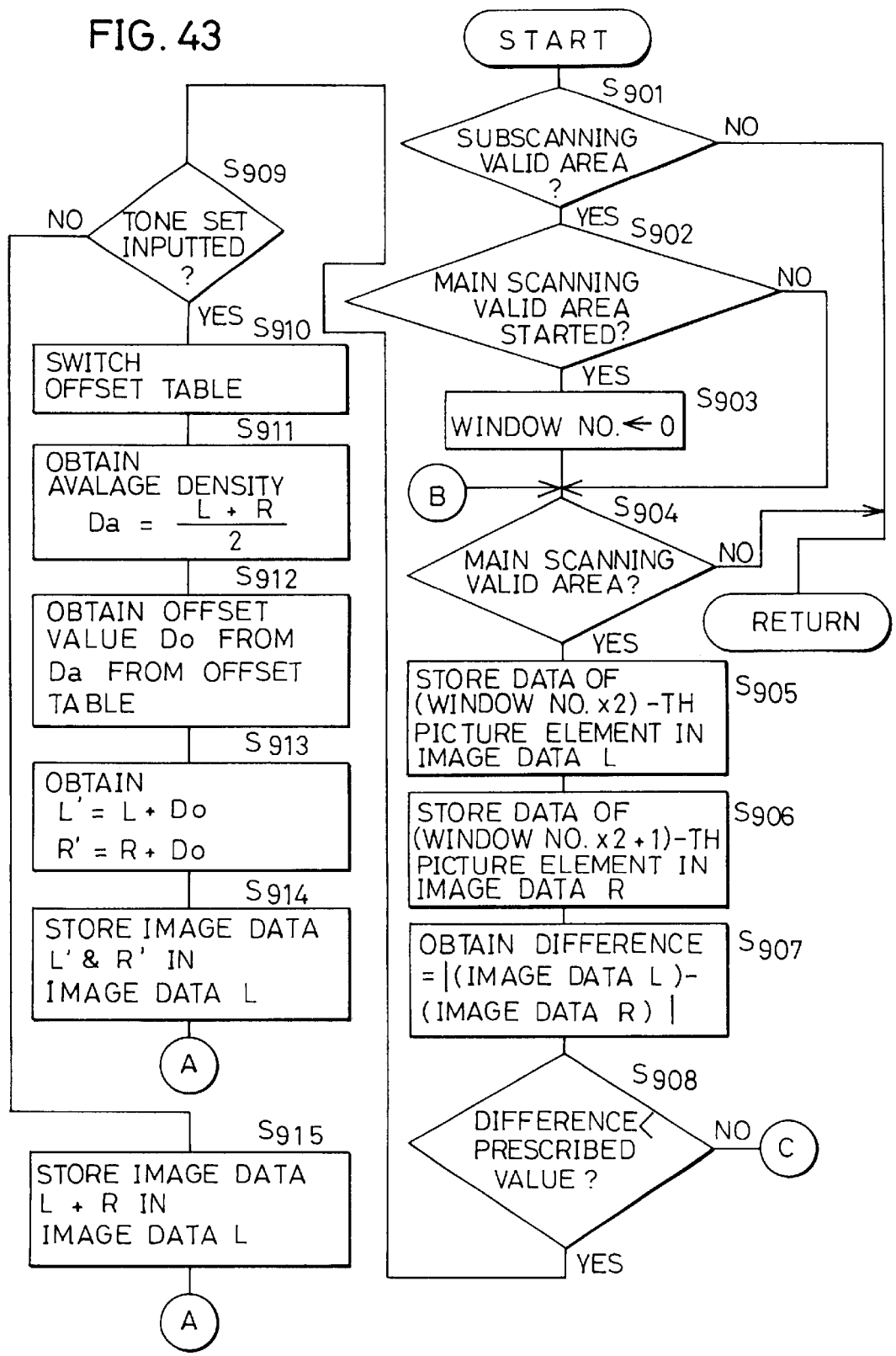
FIG. 43 is a part of a flow chart showing the content of control by the multiline screen processing processor according to the fifth embodiment of the present invention.
Figure 44:
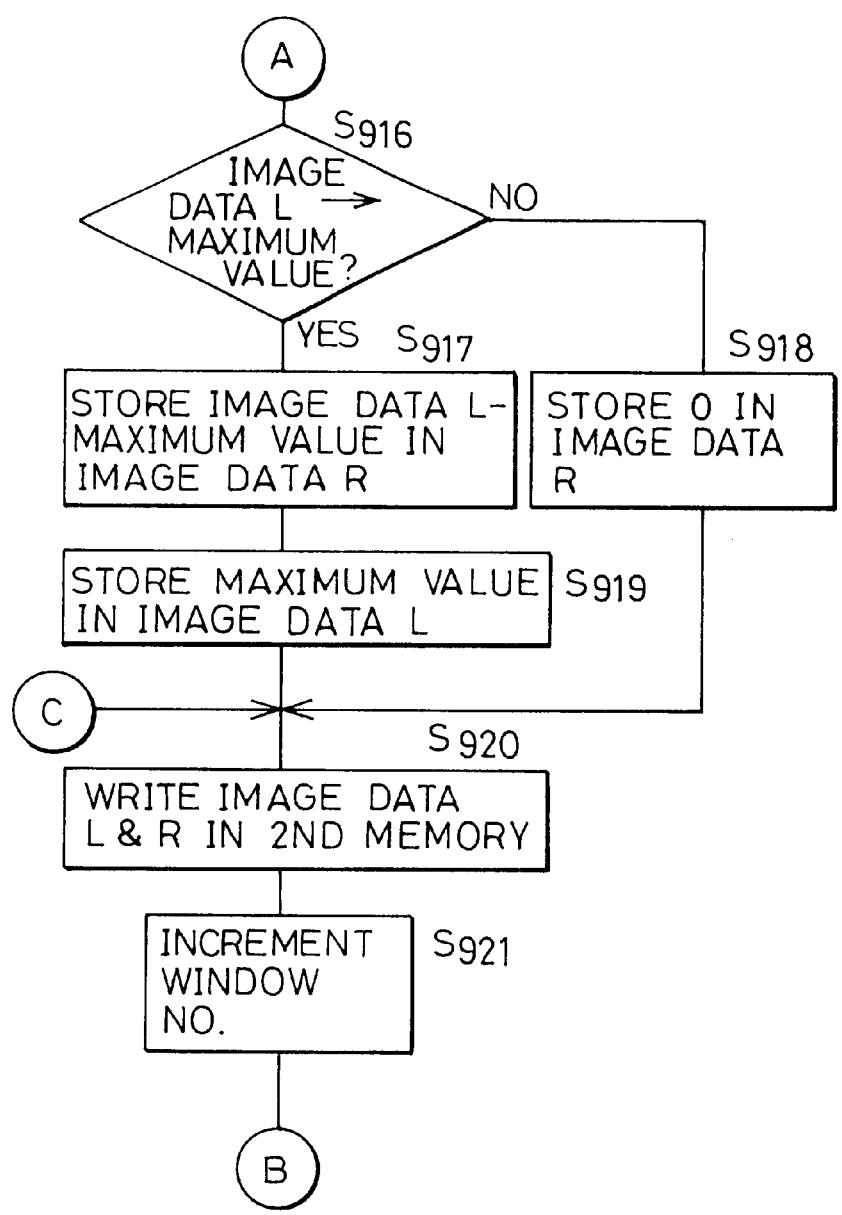
FIG. 44 is another part of the flow chart showing the content of control by the multiline screen processing processor according to the fifth embodiment of the present invention.

FIGS. 43 and 44 are flow charts for illustrating the operation of the multiline screen processing processor according to the fifth embodiment of the present invention.

Referring to FIG. 43, steps S901 to S908 are identical to the steps S501 to S508 of the first embodiment, and hence redundant description is not repeated.

If a difference is less than a prescribed value at the step S908, a determination is made at a step S909 as to whether or not tone set input is made by a tone specifying switch 221.

If the determination is of no, no tone control is required and the flow is advanced to a step S915, to perform processing similar to that of the first embodiment.

If the determination is of yes, on the other hand, an offset table responsive to the content of the tone setting is prepared from the offset value reference table 254 at a step S910. Then, average density data Da of image data L and R is calculated (S911). An offset value Do is obtained from the offset table on the basis of the data Da (S912).

Then, the offset value Do is added to the respective image data L and R to obtain image data L' and R' at a step S913 respectively. Then, the image data L is obtained by adding up the image data L' and R', and the flow is advanced to a step S916.

The contents of the steps S916 to S921 are identical to those of the steps S510 to S515 of the first embodiment, and hence redundant description is not repeated.

Figure 45:
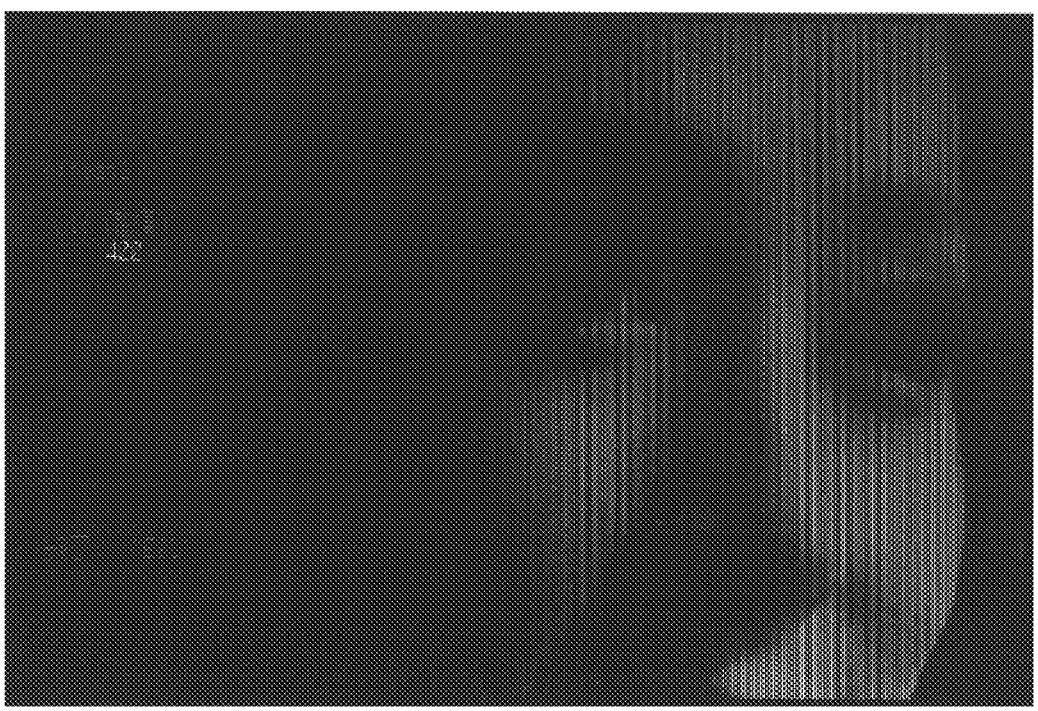
FIG. 45 shows an image which is tone-controlled by highlight enhancement according to the fifth embodiment of the present invention.
Figure 46:
FIG. 46 shows an image which is tone-controlled by shadow enhancement according to the fifth embodiment of the present invention.

FIG. 45 shows an image subjected to tone control by highlight enhancement according to the fifth embodiment of the present invention for reproducing the image shown in FIG. 16 by standard tone control, and FIG. 46 shows an image subjected to tone control by shadow enhancement according to the fifth embodiment.

Although the fifth embodiment is applied to multiline screen processing for two adjacent picture elements, this embodiment may alternatively be applied to multiline screen processing for three adjacent picture elements, similarly to the second embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image recording device for processing and recording an original image comprised of picture elements, said device comprising:

means for reading each picture element of an original image to generate image data of a multi-state value within a range of image data magnitudes;

means for detecting the magnitude of the difference between the image data of a first picture element and the image data of a second picture element immediately adjacent said first picture element;

processing means for modifying the magnitude of the image data of said first and second picture elements by reducing the magnitude of the image data of one of said first and second picture elements by a first prescribed quantity and increasing the magnitude of the image data of the other of said first and second picture elements by said first prescribed quantity; and means for forming an image on a medium in accordance with the image data as modified by said processing means.

2. An image recording device in accordance with claim 1, wherein said processing means does not modify the image data of said first and second picture elements if the difference between the respective image data for the adjacent picture elements is in excess of a second prescribed quantity.

3. The image recording device of claim 1 wherein said multi-state value comprises grayscale values having at least three discrete values.

4. An image recording device for processing and recording an original image comprised of picture elements, said device comprising:

means for reading each picture element of an original image to generate image data of a multi-state value within a range of image data magnitudes from first to second end values;

means for zeroing the magnitude of the image data of a first picture element whose magnitude lies between said first and second end values;

means for adding the magnitude of the image data of said first picture element to the magnitude of the image data of a second picture element that is adjacent to said first picture element; and means for recording the image in accordance with the modified image data of said first and second picture elements.

5. An image recording device for processing and recording an original image comprised of picture elements, said device comprising:

means for reading each picture element of an original image to generate image data of a multi-state value within a range of image data magnitudes;

means for detecting the magnitude of the difference between the image data of a first picture element and the image data of a second picture element immediately adjacent said first picture element;

processing means for modifying the magnitude of the image data by adding the magnitude of the image data of said first picture element to the magnitude of the image data of the second picture element; and means for forming an image on a medium in accordance with the image data as modified by said processing means.

6. An image recording device in accordance with claim 5, wherein the image data from said first picture element that is added to the image data of said second picture element is limited to a quantity that brings the image data of said second picture element to a prescribed value.

7. An image recording device in accordance with claim 6, wherein said prescribed value is a maximum value for said multi-state image data.

8. The image recording device of claim 5 wherein said multi-state value comprises grayscale values having at least three discrete values.

9. A method for correcting and recording an image comprised of picture elements, said method comprising the steps of:

reading each picture element of an original image to generate image data of a multi-state value within a range of image data magnitudes from first to second end values;

reducing the magnitude of the image data of a first picture element whose magnitude lies between said first and second end values by a prescribed quantity;

increasing the magnitude of the image data of a second picture element that is adjacent to said first picture element by said prescribed quantity; and recording the image on a medium in accordance with the corrected image data.

10. An image correcting and recording method in accordance with claim 9, wherein said reducing and increasing steps are successively carried out for adjacent pairs of picture elements that are arranged along a main scanning direction.

11. An image correcting and recording method in accordance with claim 10, wherein said first picture element is the right picture element and said second picture element is the left picture element in an adjacent pair of picture elements.

12. An image correcting and recording method in accordance with claim 10, wherein said steps of reducing image data and increasing image data are not carried out if the difference between the respective image data for adjacent picture elements exceeds a predetermined quantity.

13. An image correcting and recording method in accordance with claim 10, wherein said steps of reducing image data and increasing image data are carried out on adjacent pairs of picture elements included in all main scanning lines that are arranged along a subscanning direction.

14. An image recording device for processing and recording an original image comprised of picture elements, said device comprising:

means for reading each picture element of an original image to generate image data of a multi-state value within a range of image data magnitudes;

means for detecting the magnitude of the difference between the image data of a first picture element and the image data of a second picture element immediately adjacent said first picture element;

processing means for transferring image data values between said first and second picture elements on the basis of the detected magnitude difference; and means for recording an image in accordance with the image data as modified by said processing means.

15. An image recording device in accordance with claim 14, wherein said processing means transfers image data values between pairs of adjacent pixels over the entirety of the original image.

16. The image recording device of claim 14 wherein said multi-state value comprises grayscale values having at least three discrete values.

17. An image recording device for processing and recording an original image comprised of picture elements, said device comprising:

means for reading each picture element of an original image along scan lines to generate image data of a multi-state value;

means for detecting the difference between the image data of first and second picture elements that are immediately adjacent one another on the same scan line;

processing means for modifying the image data of said first and second picture elements by reducing the image data of one of said first and second picture elements by a first prescribed quantity and increasing the image data of the other of said first and second picture elements by said first prescribed quantity; and means for forming an image on a medium in accordance with the image data as modified by said processing means.

18. An image recording device in accordance with claim 17, wherein said processing means does not modify the image data of said first and second picture elements if the difference between the respective image data for the adjacent picture elements is in excess of a second prescribed quantity.

19. An image recording device for processing and recording an original image comprised of picture elements, said device comprising:

means for reading each picture element of an original image along scan lines to generate image data of a multi-state value;

means for zeroing the image data of a first picture element;

means for adding the image data of said first picture element to the image data of a second picture element that is on the same scan line and adjacent to said first picture element; and means for recording the image in accordance with the modified image data of said first and second picture elements.

20. An image recording device for processing and recording an original image comprised of picture elements, said device comprising:

means for reading each picture element of an original image along scan lines to generate image data of a multi-state value;

means for detecting the difference between the image data of first and second picture elements that are immediately adjacent one another on the same scan line;

processing means for modifying the image data by adding the image data of said first picture element to the image data of the second picture element; and means for forming an image on a medium in accordance with the image data as modified by said processing means.

21. An image recording device in accordance with claim 20, wherein the image data from said first picture element that is added to the image data of said second picture element is limited to a quantity that brings the image data of said second picture element to a prescribed value.

22. An image recording device in accordance with claim 21, wherein said prescribed value is a maximum value for said multi-state image data.

23. A method for correcting and recording an image comprised of picture elements, said method comprising the steps of:

reading each picture element of an original image along scan lines to generate image data of a multi-state value;

reducing the image data of a first picture element by a prescribed quantity;

increasing the image data of a second picture element that is adjacent to said first picture element on the same scan line by said prescribed quantity; and recording the image on a medium in accordance with the corrected image data.

24. An image correcting and recording method in accordance with claim 23, wherein said first picture element is the right picture element and said second picture element is the left picture element in an adjacent pair of picture elements.

25. An image correcting and recording method in accordance with claim 23, wherein said steps of reducing image data and increasing image data are not carried out if the difference between the respective image data for adjacent picture elements exceeds a predetermined quantity.

26. An image recording device for processing and recording an original image comprised of picture elements, said device comprising:

means for reading each picture element of an original image along scan lines to generate image data of a multi-state value;

means for detecting the difference between the image data of first and second picture elements that are immediately adjacent one another on the same scan line;

processing means for transferring image data values between said first and second picture elements; and means for recording an image in accordance with the image data as modified by said processing means.

* * * * *